US012739379B2

(12) United States Patent
Dinh et al.

(10) Patent No.: US 12,739,379 B2
(45) Date of Patent: Sep. 15, 2026

(54) IMAGE DECODING DEVICE AND IMAGE ENCODING DEVICE FOR ADAPTIVE QUANTIZATION AND INVERSE QUANTIZATION, AND METHOD PERFORMED THEREBY

(71) Applicant: SAMSUNG ELECTRONICS CO., LTD., Suwon-si (KR)

(72) Inventors: Quockhanh Dinh, Suwon-si (KR); Kwangpyo Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 19/056,172

(22) Filed: Feb. 18, 2025

(65) Prior Publication Data

US 2025/0193398 A1 Jun. 12, 2025

Related U.S. Application Data

(63) Continuation of application No. PCT/KR2023/007965, filed on Jun. 9, 2023.

(30) Foreign Application Priority Data

Aug. 18, 2022 (KR) ........................ 10-2022-0103411
Sep. 30, 2022 (KR) ........................ 10-2022-0125482

(51) Int. Cl.
*H04N 19/124* (2014.01)
*H04N 19/13* (2014.01)
(Continued)

(52) U.S. Cl.
CPC ........... *H04N 19/124* (2014.11); *H04N 19/13* (2014.11); *H04N 19/137* (2014.11); *H04N 19/189* (2014.11)

(58) Field of Classification Search
CPC .... H04N 19/124; H04N 19/13; H04N 19/137; H04N 19/189; H04N 19/503;
(Continued)

(56) References Cited

U.S. PATENT DOCUMENTS 10,373,055 B1 8/2019 Matthey-De-L'Endroit et al.
10,652,581 B1 * 5/2020 Bokov ................ H04N 19/194
(Continued)

FOREIGN PATENT DOCUMENTS

JP 2022-078735 A 5/2022
KR 10-2022-0077917 A 6/2022
(Continued)

OTHER PUBLICATIONS

International Search Report dated Sep. 7, 2023, issued by the International Searching Authority in International Application No. PCT/KR2023/007965.

(Continued)

*Primary Examiner* — Jessica M Prince
(74) *Attorney, Agent, or Firm* — Sughrue Mion, PLLC

(57) ABSTRACT

An image decoding method includes obtaining, second feature data from a bitstream for first feature data of a current image, obtaining quantization data and probability data by applying the second feature data to a neural network, modifying the probability data, based on sample values of the quantization data, obtaining quantized first feature data by applying entropy decoding, based on the modified probability data, on bits included in the bitstream, obtaining dequantized first feature data by dequantizing the quantized first feature data based on the sample values of the quantization data, and reconstructing the current image by performing neural network-based decoding on the dequantized
(Continued)

first feature data. The first feature data having been obtained by performing neural network-based encoding on the current image.

14 Claims, 18 Drawing Sheets

(51) Int. Cl.
*H04N 19/137* (2014.01)
*H04N 19/189* (2014.01)

(58) Field of Classification Search
CPC ......... H04N 19/593; G06T 9/00; G06T 9/002; G06N 3/045; G06N 3/0455; G06N 3/0464; G06N 3/047; G06N 3/08; G06N 3/084; G06N 7/01
See application file for complete search history.

(56) References Cited

U.S. PATENT DOCUMENTS

| | | | | |
|---|---|---|---|---|
| 11,388,415 | B2 | 7/2022 | Wang et al. | |
| 2020/0160565 | A1 | 5/2020 | Ma et al. | |
| 2020/0327701 | A1* | 10/2020 | Zhou | H04N 19/46 |
| 2021/0004677 | A1 | 1/2021 | Menick et al. | |
| 2021/0034969 | A1 | 2/2021 | Wayne et al. | |
| 2021/0397946 | A1* | 12/2021 | Choi | G06N 3/08 |
| 2022/0007025 | A1 | 1/2022 | Tamse et al. | |
| 2022/0237740 | A1 | 7/2022 | Lu et al. | |
| 2023/0085554 | A1 | 3/2023 | Kim et al. | |
| 2023/0145525 | A1 | 5/2023 | Dinh et al. | |
| 2024/0037802 | A1* | 2/2024 | Solovyev | G06T 9/002 |
| 2024/0056575 | A1 | 2/2024 | Ahn et al. | |

FOREIGN PATENT DOCUMENTS

| | | | |
|---|---|---|---|
| KR | 10-2022-0103087 | A | 7/2022 |
| KR | 10-2023-0067492 | A | 5/2023 |
| WO | 2021/172956 | A1 | 9/2021 |
| WO | 2021/262053 | A1 | 12/2021 |
| WO | 2022/139438 | A1 | 6/2022 |
| WO | 2022/139616 | A1 | 6/2022 |

OTHER PUBLICATIONS

Li et al., “Hybrid Spatial-Temporal Entropy Modelling for Neural Video Compression”, 2022, arXiv:2207.05894v1, pp. 1-17 (17 pages total).

Agustsson et al., “Scale-space flow for end-to-end optimized video compression”, CVF, 2020, pp. 8503-8512 (10 pages total).

Lu et al., “DVC: An End-to-end Deep Video Compression Framework”, CVF, 2019, pp. 11006-11015 (10 pages total).

Mentzer et al., “Towards Generative Video Compression”, 2021, http://arxiv.org/abs/2107.12038, pp. 1-19 (19 pages total).

Zhang et al., “BVI-DVC a Training Database for Deep Video Compression”, 2020, https://research-information.bris.ac.uk/en/datasets/bvi-dvc, pp. 1-11 (11 pages total).

Wang et AL., “MCL-JCV: A JND-Based H.264/AVC Video Quality Assessment Dataset”, ICIP, 2016, http://mcl.usc.edu/mcl-jcv-dataset/, pp. 1509-1513 (5 pages total).

Extended European Search Report dated Jun. 24, 2026, issued by the European Patent Office in European Application No. 23854995.0.

Li et al., “Hybrid Spatial-Temporal Entropy Modelling for Neural Video Compression”, arXiv:2207.05894v1 [eess.IV] Jul. 13, 2022, 2022, (17 pages total).

* cited by examiner

| | LAPLACIAN | GAUSSIAN |
|---|---|---|
| PROBABILITY DATA | Mean: $\mu_a$<br>Standard dev.: $\sigma_a$ | |
| MODIFIED PROBABILITY DATA | Mean: $\mu_b = \mu_a/q$<br>Standard dev.: $\sigma_b = \sigma_a/q$ | |
| PROBABILITY MODEL | $p(x\|\mu,\sigma)=\frac{1}{\sqrt{2}\sigma}e^{-\frac{\sqrt{2}\|x-\mu\|}{\sigma}}$ | $p(x\|\mu,\sigma)=\frac{1}{\sigma\sqrt{2\pi}}e^{-\frac{1}{2}\left(\frac{x-\mu}{\sigma}\right)^2}$ |

Figure 11:
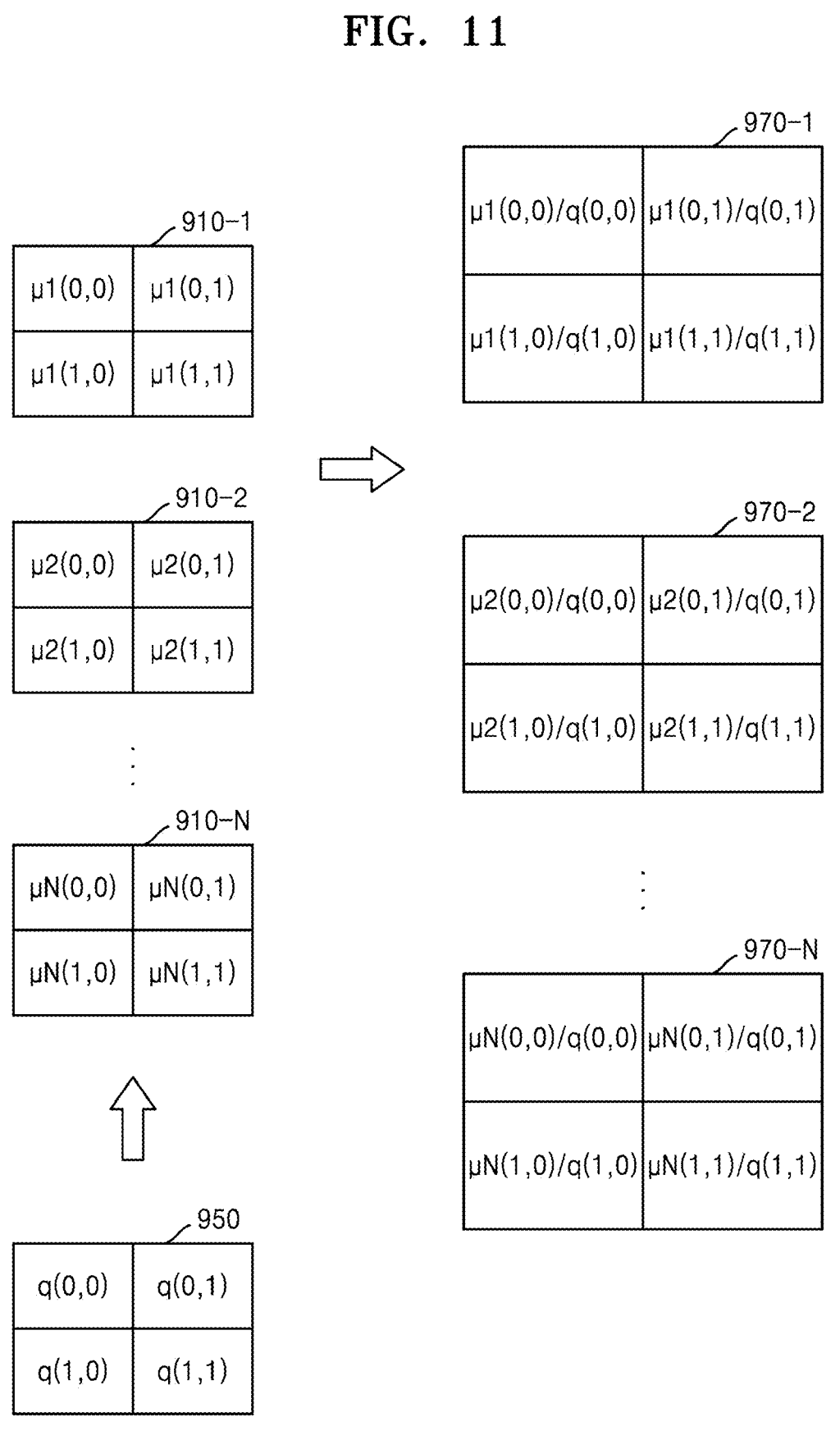

| μ1(0,0) | μ1(0,1) |
|---|---|
| μ1(1,0) | μ1(1,1) |

910-2

| μ2(0,0) | μ2(0,1) |
|---|---|
| μ2(1,0) | μ2(1,1) |

⋮

910-N

| μN(0,0) | μN(0,1) |
|---|---|
| μN(1,0) | μN(1,1) |

950

| q(0,0) | q(0,1) |
|---|---|
| q(1,0) | q(1,1) |

970-1

| μ1(0,0)/q(0,0) | μ1(0,1)/q(0,1) |
|---|---|
| μ1(1,0)/q(1,0) | μ1(1,1)/q(1,1) |

970-2

| μ2(0,0)/q(0,0) | μ2(0,1)/q(0,1) |
|---|---|
| μ2(1,0)/q(1,0) | μ2(1,1)/q(1,1) |

⋮

970-N

| μN(0,0)/q(0,0) | μN(0,1)/q(0,1) |
|---|---|
| μN(1,0)/q(1,0) | μN(1,1)/q(1,1) |

FIG. 12

| | LAPLACIAN | GAUSSIAN |
|---|---|---|
| PROBABILITY DATA | Means: $\mu_a = (\mu_{a1}, \cdots, \mu_{aN})$<br>Standard dev.: $\sigma_a = (\sigma_{a1}, \cdots, \sigma_{aN})$<br>weights: $w = (w_1, \cdots, w_N)$ | |
| MODIFIED PROBABILITY DATA | Means: $\mu_b = \mu_a/q = (\mu_{b1}, \cdots, \mu_{bN})$<br>Standard dev.: $\sigma_b = \sigma_a/q = (\sigma_{b1}, \cdots, \sigma_{bN})$ | |
| PROBABILITY MODEL | $p(x\|w,\mu,\sigma)=\sum_{n=1,\ldots,N} \frac{w_n}{\sqrt{2}\sigma_n} e^{-\frac{\sqrt{2}\|x-\mu_n\|}{\sigma_n}}$ | $p(x\|w,\mu,\sigma)=\sum_{n=1,\ldots,N} \frac{w_n}{\sigma_n\sqrt{2\pi}} e^{-\frac{1}{2}\left(\frac{x-\mu_n}{\sigma_n}\right)^2}$ |

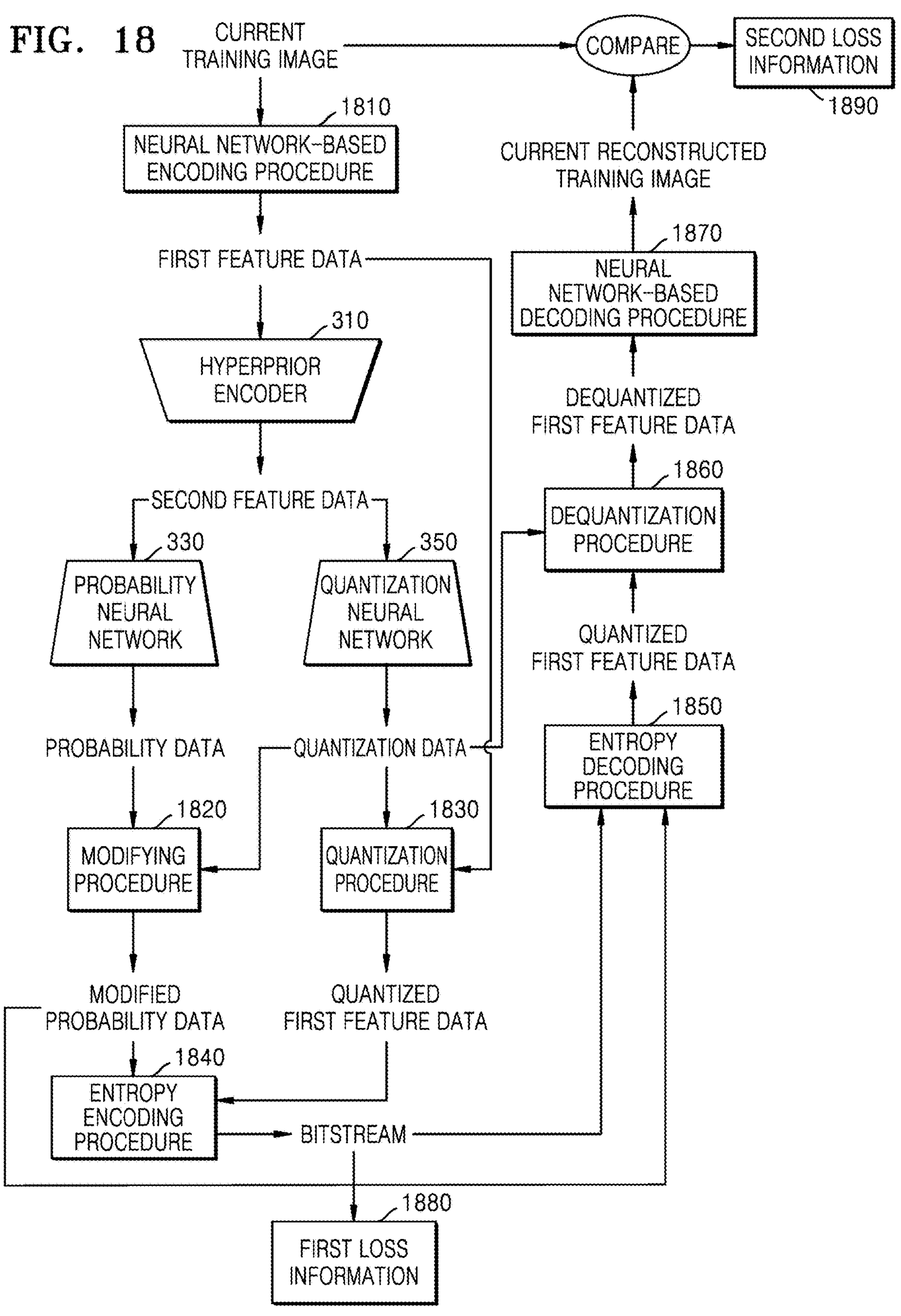
FIG. 18
CURRENT TRAINING IMAGE
COMPARE
SECOND LOSS INFORMATION
1890
1810
NEURAL NETWORK-BASED ENCODING PROCEDURE
CURRENT RECONSTRUCTED TRAINING IMAGE
1870
FIRST FEATURE DATA
NEURAL NETWORK-BASED DECODING PROCEDURE
310
HYPERPRIOR ENCODER
DEQUANTIZED FIRST FEATURE DATA
1860
SECOND FEATURE DATA
330
350
DEQUANTIZATION PROCEDURE
PROBABILITY NEURAL NETWORK
QUANTIZATION NEURAL NETWORK
QUANTIZED FIRST FEATURE DATA
1850
PROBABILITY DATA
QUANTIZATION DATA
ENTROPY DECODING PROCEDURE
1820
1830
MODIFYING PROCEDURE
QUANTIZATION PROCEDURE
MODIFIED PROBABILITY DATA
QUANTIZED FIRST FEATURE DATA
1840
ENTROPY ENCODING PROCEDURE
BITSTREAM
1880
FIRST LOSS INFORMATION

IMAGE DECODING DEVICE AND IMAGE ENCODING DEVICE FOR ADAPTIVE QUANTIZATION AND INVERSE QUANTIZATION, AND METHOD PERFORMED THEREBY

CROSS-REFERENCE TO RELATED APPLICATIONS

This application is a continuation application of International Application No. PCT/KR2023/007965, filed on Jun. 9, 2023, which claims priority to Korean Patent Application No. 10-2022-0103411, filed on Aug. 18, 2022, and to Korean Patent Application No. 10-2022-0125482, filed on Sep. 30, 2022, in the Korean Intellectual Property Office, the disclosures of which are incorporated by reference herein in their entireties.

BACKGROUND

1. Field

The present disclosure relates generally to image encoding and decoding, and more particularly, to encoding and decoding an image by using artificial intelligence (AI).

2. Description of Related Art

Codecs such as, but not limited to, H.264 advanced video coding (AVC) and high efficiency video coding (HEVC), may divide an image into blocks and perform predictive encoding and predictive decoding on each block through inter prediction and/or intra prediction.

Intra prediction may refer to a method of compressing images by removing spatial redundancy in the images, and inter prediction may refer to a method of compressing images by removing temporal redundancy between the images.

An example of inter prediction may be motion estimation encoding. Motion estimation encoding may include predicting blocks of the current image by using a reference image. For example, an evaluation function may be used to search a range for the most similar reference block to a current block. The current block may be predicted based on the reference block, and a predicted block generated as the prediction result may be subtracted from the current block to generate and encode a residual block.

To derive a motion vector that indicates the reference block in a reference image, a motion vector of previously encoded blocks may be used as a motion vector predictor of the current block. A differential motion vector, which may be the difference between the motion vector of the current block and the motion vector predictor, may be signaled to a decoder according to a method.

Recently, technologies for encoding/decoding images by using artificial intelligence (AI) may have been proposed, as there may be a need for a scheme for effectively encoding/decoding images by using AI (e.g., a neural network).

SUMMARY

According to an aspect of the present disclosure, an image decoding method includes obtaining, second feature data from a bitstream generated for first feature data of a current image, obtaining quantization data and probability data by applying the second feature data to a neural network, modifying the probability data, based on sample values of the quantization data, obtaining quantized first feature data by applying entropy decoding, based on the modified probability data, on bits included in the bitstream, obtaining dequantized first feature data by dequantizing the quantized first feature data based on the sample values of the quantization data, and reconstructing the current image by performing neural network-based decoding on the dequantized first feature data. The first feature data having been obtained by performing neural network-based encoding on the current image.

In an embodiment of the image decoding method, the quantization data may include at least one sample value including at least one of a quantization parameter or a quantization step size.

In an embodiment of the image decoding method, at least one value of the modified probability data may indicate a probability that at least one sample of the quantized first feature data is set to a corresponding value.

In an embodiment of the image decoding method, at least one value of the modified probability data may indicate an average value and a standard deviation corresponding to at least one sample of the quantized first feature data.

In an embodiment, the image decoding method may further include applying an average and a standard deviation indicated by at least one sample value of the modified probability data to a predetermined probability model to derive a probability that a least one sample of the quantized first feature data is set to a corresponding value.

In an embodiment, the modifying of the probability data of the image decoding method may include dividing sample values of the probability data by the sample values of the quantization data.

In an embodiment of the image decoding method, the first feature data may include at least one of feature data obtained by applying the current image to an image encoder, feature data obtained by applying the current image and a previously reconstructed image to an optical flow encoder, or feature data obtained by applying a residual image corresponding to the current image to a residual encoder.

In an embodiment of the image decoding method, the neural network may be trained based on at least one of a bitrate of the bitstream or a difference between a current training image and a current reconstructed training image.

In an embodiment, the image decoding method may further include obtaining a plurality of probability data and a plurality of weights by applying the second feature data to the neural network, modifying the plurality of probability data, based on the sample values of the quantization data, and determining a probability that at least one sample of the quantized first feature data is set to a corresponding value by combining the modified plurality of probability data according to the plurality of weights.

According to an aspect of the present disclosure, a non-transitory computer-readable storage medium storing computer-executable instructions for image decoding that, when executed by at least one processor of a device, cause the device to perform the image decoding method.

According to an aspect of the present disclosure, an image encoding method includes applying, to a first neural network, first feature data obtained by performing neural network-based encoding on a current image to obtain second feature data of the first feature data, obtaining quantization data and probability data by applying the second feature data to a second neural network, modifying the probability data, based on sample values of the quantization data, obtaining quantized first feature data by quantizing the first feature data according to the sample values of the quantization data, and generating a bitstream including first bits corresponding to the quantized first feature data, by applying entropy encoding, based on the modified probability data, to the quantized first feature data. The bitstream further includes second bits corresponding to the second feature data.

In an embodiment, the obtaining of the quantization data and the probability data of the image encoding method may include outputting the quantization data by applying the second feature data to a quantization neural network, and outputting the probability data by applying the second feature data to a probability neural network.

In an embodiment, the modifying of the probability data of the image encoding method may include dividing sample values of the probability data by the sample values of the quantization data.

According to an aspect of the present disclosure, an image decoding device includes one or more processors including processing circuitry, and a memory storing instructions. The instructions, when executed by the one or more processors individually or collectively, cause the image decoding device to obtain, second feature data from a bitstream generated from first feature data of a current image, obtain quantization data and probability data by applying the second feature data to a neural network, modify the probability data, based on sample values of the quantization data, obtain quantized first feature data by applying entropy decoding based on the modified probability data on bits included in the bitstream, obtain dequantized first feature data by dequantizing the quantized first feature data based on the sample values of the quantization data, and reconstruct the current image by performing neural network-based decoding on the dequantized first feature data. The first feature data having been outputted by performing neural network-based encoding trained to output the first feature data of the current image.

According to an aspect of the present disclosure, an image encoding device includes one or more processors including processing circuitry, and a memory storing instructions. The instructions, when executed by the one or more processors individually or collectively, cause the image encoding device to obtain first feature data by performing neural network-based encoding on a current image, obtain second feature data of the first feature data by applying the first feature data to a first neural network, obtain quantization data and probability data by applying the second feature data to a second neural network, modify the probability data, based on sample values of the quantization data, obtain quantized first feature data by quantizing the first feature data based on the sample values of the quantization data, and generate a bitstream corresponding to the current image by applying entropy encoding, based on the modified probability data, to the quantized first feature data. The bitstream includes first bits corresponding to the quantized first feature data and second bits corresponding to the second feature data.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 9 is a diagram for describing a method of modifying probability data, according to an embodiment;

FIG. 10 is a diagram illustrating probability data, modified probability data and a probability model, according to an embodiment;

FIG. 11 is a diagram for describing a method of modifying a plurality of probability data, according to an embodiment;

FIG. 12 is a diagram illustrating a plurality of probability data, a plurality of modified probability data and a probability model, according to an embodiment;

FIG. 18 is a diagram for describing a method of training neural networks, according to an embodiment.

DETAILED DESCRIPTION

Figure 1:
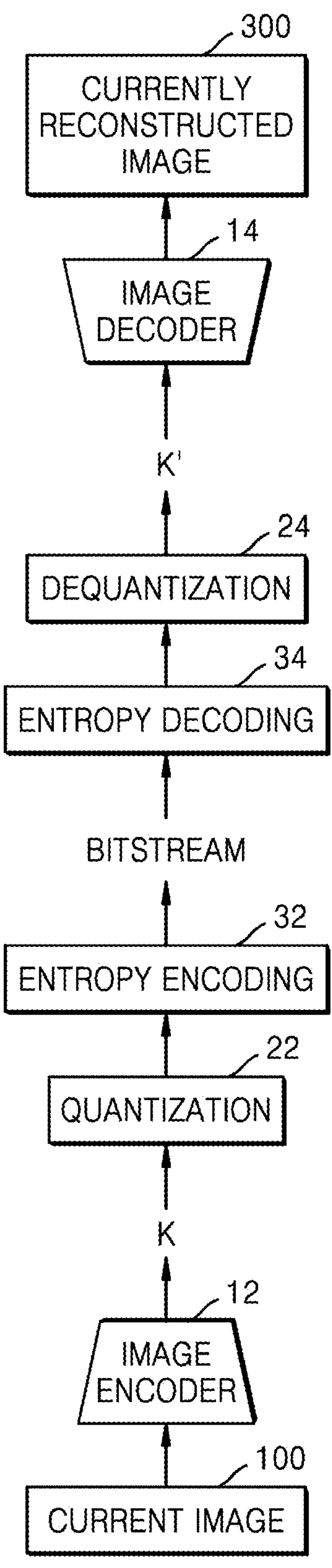
FIG. 1 is a diagram for describing encoding and decoding procedures for a current image based on intra prediction, according to an embodiment.

Various modifications may be made to embodiments of the present disclosure, which are described hereinafter with reference to the accompanying drawings. The present disclosure is not limited to particular embodiments, however, may include all the modifications, equivalents and replacements which belong to technical scope and ideas of the present disclosure.

Some related well-known technologies that may obscure the present disclosure may not be described. Ordinal numbers (e.g., first, second, or the like) as herein may only be used to distinguish components from one another.

With regard to the description of the drawings, similar reference numerals may be used to refer to similar or related elements. It is to be understood that a singular form of a noun corresponding to an item may include one or more of the things, unless the relevant context clearly indicates otherwise. Throughout the present disclosure, the expression "at least one of a, b or c" indicates only a, only b, only c, both a and b, both a and c, both b and c, all of a, b, and c, or variations thereof.

When the term "connected" or "coupled" is used, it may indicate that a component may be directly connected or coupled to another component. However, unless otherwise defined, it may also be understood that the component may be indirectly connected or coupled to the other component via another new component.

Throughout the disclosure, a component expressed with "~unit", "~module", or the like may be a combination of two or more components or may be divided by function into two or more. Each of the components may perform its major function and further perform part or all of a function served by another component. In this way part of a major function served by each component may be dedicated and performed by another component.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

In the present disclosure, the term "image" may indicate a still image, a picture, a frame, a moving image comprised of a plurality of successive still images or a video.

In the present disclosure, a neural network may be a typical example of an artificial neural network model that may simulate the operation and/or functionality of cranial nerves, and may not be limited to an artificial neural network that employs a particular algorithm. In an embodiment, a neural network may refer to a deep neural network.

In the present disclosure, the term "parameter" may indicate a value used in an operation process on each layer that makes up the neural network, which may be used, for example, when an input value is applied to a certain operation expression. The parameter may be a value set as a result of training, which may be updated with extra training data as needed.

In the present disclosure, the term "feature data" may refer to data obtained by processing input data by a neural network or a neural network-based encoder. The feature data may be one dimensional (1D) and/or two dimensional (2D) data that may include multiple samples. The feature data may also be referred to as a latent representation. The feature data may represent a latent feature in data output by a neural network-based decoder.

In the present disclosure, a current image may refer to an image that is a current subject of processing, and a previous image may refer to an image that is a subject of processing before the current image. The current image and/or previous image may also be a block divided from the current image or previous image.

In the present disclosure, the term "sample" may refer to data allocated to a sampling position in 1D or 2D data such as, but not limited to, an image, feature data, probability data or quantization data, and may be a subject of processing. For example, the sample may include a pixel in a 2D image. The term "2D data" may also be referred to as a map.

An AI based end-to-end encoding/decoding system may be understood as a system that may use a neural network in an image encoding and decoding procedures.

Similarly to codecs such as, but not limited to, high efficiency video coding (HEVC), versatile video coding (VVC), or the like, the AI based end-to-end encoding/decoding system may use intra prediction and/or inter prediction for image encoding and decoding.

Intra prediction may refer to a method of compressing images by removing spatial redundancy in the images, and the inter prediction may refer to a method of compressing images by removing temporal redundancy between the images.

In an embodiment, the intra prediction may be applied to the first of multiple frames, a frame that becomes a random access point, and/or a frame in which a scene change occurs.

In an embodiment, the inter prediction may be applied to frames subsequent to the frame, to which the intra prediction is applied, from among the multiple frames.

Figure 2:
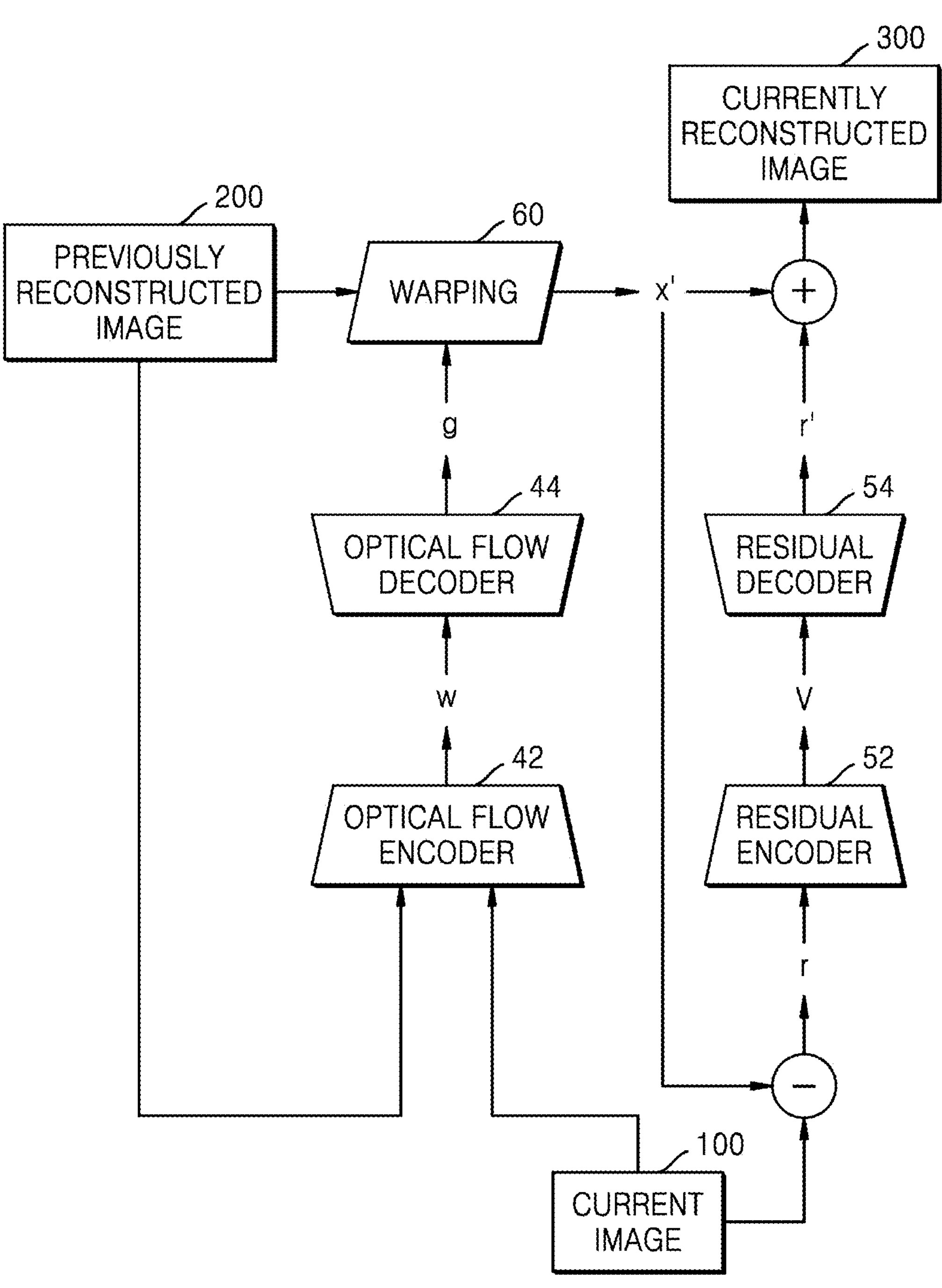
FIG. 2 is a diagram for describing encoding and decoding procedures for a current image based on inter prediction, according to an embodiment.

Referring to FIGS. 1 and 2, the intra prediction and the inter prediction performed by the AI based end-to-end encoding/decoding system, according to an embodiment, is described.

FIG. 1 is a diagram for describing encoding and decoding procedures for a current image 100 based on intra prediction, according to an embodiment.

In intra prediction, an image encoder 12 and an image decoder 14 may be used. The image encoder 12 and the image decoder 14 may be implemented by a neural network. The neural network may be and/or may include a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof. However, the present disclosure is not limited thereto.

The image encoder 12 may process the current image 100 according to parameters configured by training to output feature data k of the current image 100.

A bitstream is generated by applying quantization 22 and entropy encoding 32 to the feature data k of the current image 100, and the bitstream may be forwarded to an image decoding device from an image encoding device.

Entropy decoding 34 and dequantization 24 are applied to the bitstream to obtain restored feature data k', and the restored feature data k' may be input to the image decoder 14.

The image decoder 14 may process the feature data k' according to parameters configured by training to output a currently reconstructed image 300.

In the intra prediction, a spatial feature in the current image 100 is taken into account, so unlike inter prediction as shown in FIG. 2, only the current image 100 may be input to the image encoder 12.

FIG. 2 is a diagram for describing encoding and decoding procedures for the current image 100 based on inter prediction, according to an embodiment.

In inter prediction, an optical flow encoder 42, an optical flow decoder 44, a residual encoder 52 and a residual decoder 54 may be used.

The optical flow encoder 42, the optical flow decoder 44, the residual encoder 52 and the residual decoder 54 may be implemented by a neural network.

The optical flow encoder 42 and the optical flow decoder 44 may be understood as a neural network for extracting an optical flow g from the current image 100 and a previously reconstructed image 200.

The residual encoder 52 and the residual decoder 54 may be understood as a neural network for encoding and decoding a residual image r.

As described above, the inter prediction is a procedure for encoding and decoding the current image 100 by using temporal redundancy between the current image 100 and the previously reconstructed image 200. The previously reconstructed image 200 may be an image obtained by decoding a previous image that has been a subject of processing before the current image 100 is processed.

A difference in position (or a motion vector) between blocks or samples in the current image 100 and reference blocks or reference samples in the previously reconstructed image 200 may be used for encoding and decoding the current image 100. The difference in position may also be referred to as an optical flow. The optical flow may be defined as a set of motion vectors corresponding to the samples or blocks in the image.

The optical flow g may represent how the positions of samples in the previously reconstructed image 200 have changed in the current image 100, or where identical/similar samples to the samples in the current image 100 are located in the previously reconstructed image 200.

For example, when a sample that is identical or the most similar to a sample located at (1, 1) in the current image 100 is located at (2, 1) in the previously reconstructed image 200, the optical flow g or motion vector of the sample may be derived as (1 (=2−1), 0 (=1−1)).

To encode the current image 100, the previously reconstructed image 200 and the current image 100 may be input to the optical flow encoder 42.

The optical flow encoder 42 may process the current image 100 and the previously reconstructed image 200 according to parameters configured as a result of training to output feature data w of the optical flow g.

As described in connection with FIG. 1, a bitstream is generated by applying the quantization 22 and the entropy encoding 32 to the feature data w of the optical flow g, and the feature data w of the optical flow g may be restored by applying the entropy decoding 34 and the dequantization 24 to the bitstream.

The feature data w of the optical flow g may be input to the optical flow decoder 44. The optical flow decoder 44 may process the input feature data w according to parameters configured as a result of training to output the optical flow g.

The previously reconstructed image 200 may be warped by warping 60 based on the optical flow g, and as a result of the warping 60, a currently predicted image x' may be obtained. The warping 60 is a type of geometric transformation that shifts positions of samples in an image.

According to the optical flow g that represents relative positional relationships between the samples in the previously reconstructed image 200 and the samples in the current image 100, the warping 60 may be applied to the previously reconstructed image 200, to obtain the currently predicted image x' that is similar to the current image 100.

For example, when a sample located at (1, 1) in the previously reconstructed image 200 is the most similar to a sample located at (2, 1) in the current image 100, the sample located at (1, 1) in the previously reconstructed image 200 may be shifted to (2, 1) through the warping 60.

As the currently predicted image x' generated from the previously reconstructed image 200 is not the current image 100 itself, a residual image r between the currently predicted image x' and the current image 100 may be obtained.

For example, the residual image r may be obtained by subtracting sample values in the currently predicted image x' from sample values in the current image 100.

The residual image r may be input to the residual encoder 52. The residual encoder 52 may process the residual image r according to parameters configured as a result of training to output feature data v of the residual image r.

As described in connection with FIG. 1, a bitstream is generated by applying the quantization 22 and the entropy encoding 32 to the feature data v of the residual image r, and the feature data v of the residual image r may be restored by applying the entropy decoding 34 and the dequantization 24 to the bitstream.

The feature data v of the residual image r may be input to the residual decoder 54. The residual decoder 54 may process the input feature data v according to parameters configured as a result of training to output a reconstructed residual image r'.

The currently reconstructed image 300 may be obtained by combining the currently predicted image x' and the reconstructed residual image r'.

As described above, for the feature data k of the current image 100, the feature data w of the optical flow g and the feature data v of the residual image r, the entropy encoding 32 and the entropy decoding 34 may be applied. Entropy coding is an encoding method that varies average length of a code that represents a symbol according to a probability of the symbol, so probabilities of values that samples of first feature data are able to have may be required for the entropy encoding 32 and entropy decoding 34 of the first feature data.

In an embodiment, to improve efficiency of the entropy encoding 32 and/or entropy decoding 34 of at least one (hereinafter, the first feature data) of the feature data k of the current image 100, the feature data w of the optical flow g, or the feature data w of the residual image r, probability data may be obtained on a neural network basis.

The probability data is 1D or 2D data, which may represent a probability of a value that a sample of the first feature data is able to have.

In an embodiment, probabilities of values that the samples of the first feature data are able to have may be derived by applying the sample values of the probability data to a predetermined probability model (e.g., Laplacian probability model or Gaussian probability model).

In an embodiment, the probability data may include an average and standard deviation (or deviation) corresponding to a sample of the first feature data as a sample value.

A method of obtaining the probability data based on a neural network is described with reference to FIG. 3.

Figure 3:
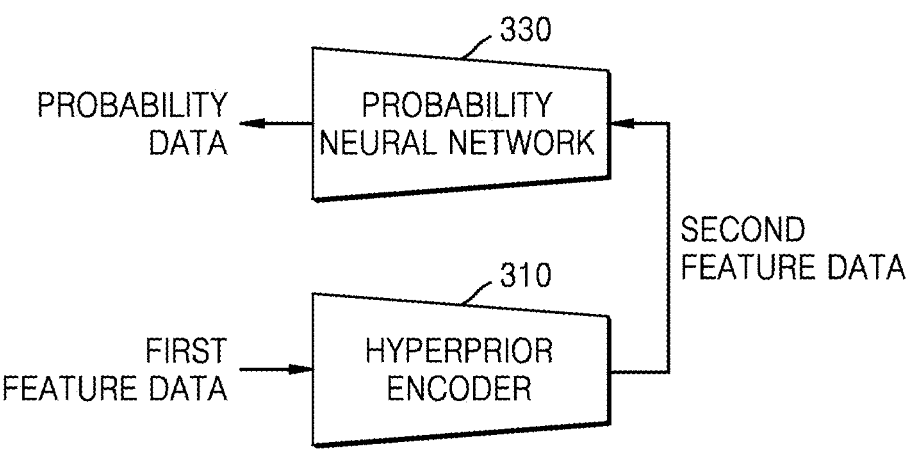
FIG. 3 is a diagram for describing a method of obtaining probability data used for entropy encoding and entropy decoding, according to an embodiment.

FIG. 3 is a diagram for describing a method of obtaining probability data used for entropy encoding and entropy decoding, according to an embodiment.

In obtaining probability data used in the entropy encoding 32 and/or entropy decoding 34, a hyperprior encoder 310 and a probability neural network 330 may be used.

The hyperprior encoder 310 may be a neural network for obtaining feature data from another feature data.

Referring to FIG. 3, the first feature data may be input to the hyperprior encoder 310, and the hyperprior encoder 310 may process the first feature data according to parameters configured as a result of training to output second feature data.

The second feature data may represent a latent feature in the first feature data, and may thus be referred to as hyperprior feature data.

The second feature data may be input to the probability neural network 330, and the probability neural network 330 may process the second feature data according to parameters configured as a result of training to output probability data.

The probability data may be used in the entropy encoding 32 and the entropy decoding 34 as described in connection with FIGS. 1 and 2.

In an embodiment, in an encoding procedure for the current image 100, a bitstream may be obtained by applying the entropy encoding 32 based on the probability data to at least one of quantized first feature data (e.g., quantized feature data of the current image 100) quantized feature data of the optical flow g or quantized feature data of the residual image r.

In an embodiment, in a decoding procedure for the current image 100, at least one of quantized first feature data (e.g., quantized feature data of the current image 100) quantized feature data of the optical flow g or quantized feature data of the residual image r may be obtained by applying the entropy decoding 34 based on probability data to bits included in the bitstream.

The procedure for obtaining probability data as shown in FIG. 3 may be useful for an occasion when the quantization 22 and the dequantization 24 for the first feature data are performed uniformly. This is because the probability data obtained from the second feature data that represents a latent feature in the first feature data may be equally applied to the quantized first feature data.

That the quantization 22 and the dequantization 24 are uniformly performed may indicate that both quantization step sizes used for the quantization 22 and the dequantization 24 for the samples of the first feature data are the same. For example, when the quantization step size is two (2), the first feature data may be quantized by dividing all the sample values of the first feature data by two (2) and rounding the resultant values. Furthermore, the quantized first feature data may be dequantized by multiplying all the sample values of the quantized first feature data by two (2).

When the quantization 22 is performed based on a quantization step size, a distribution of the sample values of the first feature data before quantization 22 may be maintained similarly even for the first feature data after quantization 22. This is because all the sample values of the first feature data are divided based on the same value and then rounded. In other words, as the distribution of the sample values of the first feature data before quantization 22 remains the same as for the first feature data after quantization 22, the probability data obtained from the second feature data may be applied as is even to the quantized first feature data.

Uniform quantization and uniform dequantization may be useful for an occasion when the sample values of the first feature data follow a Laplacian distribution. However, as the distribution of the sample values of the first feature data may vary depending on the feature of the image, there may be some limitations on uniform quantization and uniform dequantization.

In an embodiment, efficiency of the quantization 22 and the dequantization 24 may be improved by obtaining data related to the quantization 22 (e.g., a quantization step size) on a neural network basis from hyperprior feature data of the first feature data that is subject to the quantization 22.

Figure 4:
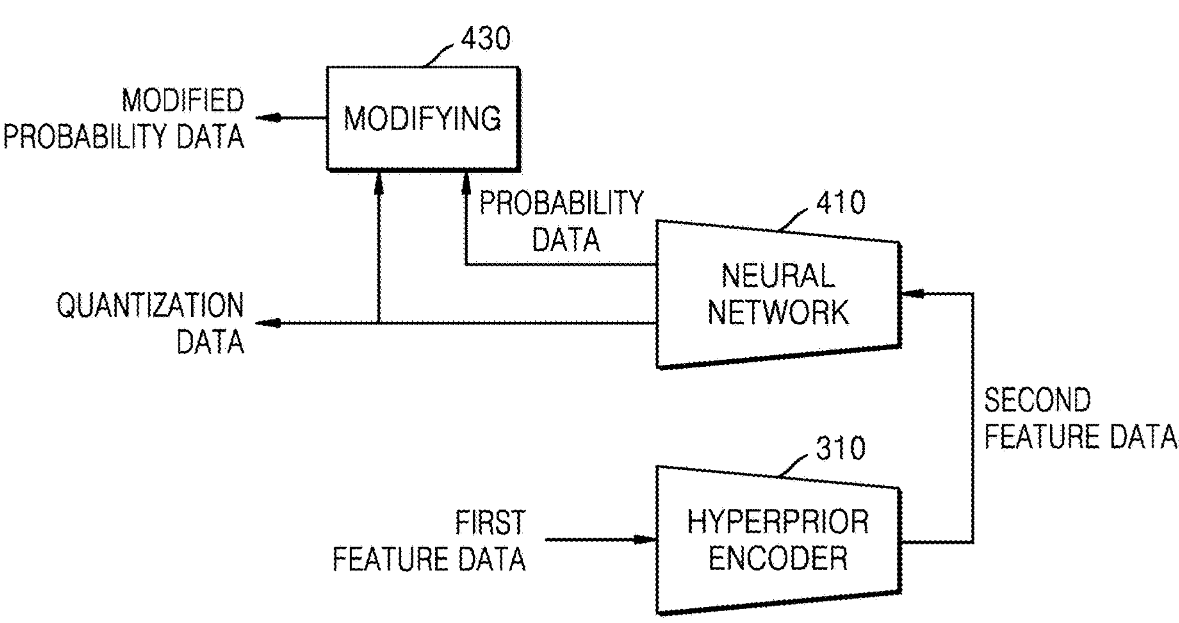
FIG. 4 is a diagram for describing a method of obtaining quantization data used for quantization and dequantization, and modified probability data used for entropy encoding and entropy decoding, according to an embodiment.

FIG. 4 is a diagram for describing a method of obtaining quantization data used for the quantization 22 and the dequantization 24, and modified probability data used for the entropy encoding 32 and the entropy decoding 34, according to an embodiment.

Referring to FIG. 4, the first feature data may be input to the hyperprior encoder 310, and the hyperprior encoder 310 may process the first feature data according to parameters configured as a result of training to output the second feature data.

The second feature data may be input to a neural network 410. The neural network 410 may process the second feature data according to parameters configured as a result of training to output probability data and quantization data.

The quantization data may include the quantization step size or quantization parameters as sample values.

The quantization step size is a value used for the quantization 22 of the sample, and a sample value may be quantized by dividing the sample value by the quantization step size and rounding a result of the dividing. On the contrary, the quantized sample value may be dequantized by multiplying the quantized sample value by the quantization step size.

The quantization step size may be approximated as an equation similar to Equation 1.

$$\text{Quantization step size} = \frac{2^{(\text{quantization parameter}/n)}}{\text{quantization scale [quantization parameter \% } n]} \quad \text{[Equation 1]}$$

Referring to Equation 1, the quantization scale[quantization parameter % n] may represent a scale value indicated by the quantization parameter from among predetermined n scale values. The HEVC codec may define six (6) scale values (e.g., 26214, 23302, 20560, 18396, 16384 and 14564), so n may be set to six (6) (e.g., n=6), according to the HEVC codec.

In an embodiment, when the quantization data includes quantization parameters as samples, the quantization step size may be obtained from the quantization parameters for the quantization 22 and the dequantization 24 of the first feature data. For example, the aforementioned Equation 1 may be used to derive the quantization step size.

When the quantization step size is obtained from the quantization data, the samples of the first feature data may be quantized according to the quantization step size, and samples of the quantized first feature data may be dequantized according to the quantization step size.

In an embodiment, as the quantization step size for the samples of the first feature data is adaptively obtained for each sample from the neural network 410 trained through a training procedure is described with reference to FIG. 18, the currently reconstructed image 300 of high quality may be obtained at a low bitrate as compared to uniform quantization and uniform dequantization.

As the first feature data is quantized according to the quantization data obtained through the procedure shown in FIG. 4, the distribution of the sample values of the first feature data before the quantization 22 may be different from the distribution of the sample values of the first feature data after the quantization 22. Hence, there is a need to modify the probability data that is suitable for the aforementioned uniform quantization and uniform dequantization.

In an embodiment, a modifying procedure 430 based on the quantization data may be applied to the probability data output from the neural network 410 to obtain modified probability data. The modified probability data may be used in the entropy encoding 32 for the quantized first feature data and the entropy decoding 34 for the bitstream.

A method of modifying the probability data is described with reference to FIGS. 9 to 12.

In the embodiment as described in connection with FIG. 4, the quantization data and the probability data may be obtained from the second feature data corresponding to a latent feature of the first feature data that is a subject of the quantization 22 and the entropy encoding 32, and the probability data is modified according to the quantization data, thereby increasing efficiency of the quantization 22 and the entropy encoding 32 to be performed in sequence.

Figure 5:
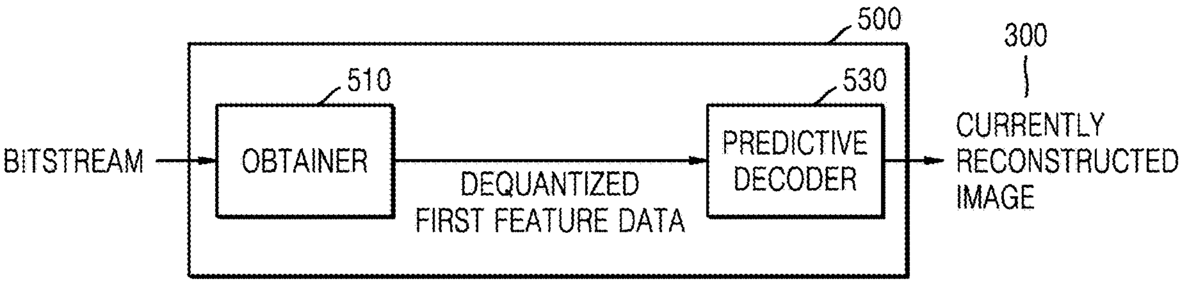
FIG. 5 is a diagram illustrating a configuration of an image decoding device, according to an embodiment.

FIG. 5 is a diagram illustrating a configuration of an image decoding device 500, according to an embodiment.

Referring to FIG. 5, the image decoding device 500 may include an obtainer 510 and a predictive decoder 530, according to an embodiment.

The obtainer 510 and the predictive decoder 530 may be implemented by at least one processor. The obtainer 510 and the predictive decoder 530 may operate according to at least one instruction stored in a memory.

The obtainer 510 and the predictive decoder 530 are shown separately in FIG. 5, but the obtainer 510 and the predictive decoder 530 may be implemented by one processor. In this case, the obtainer 510 and the predictive decoder 530 may be implemented by a dedicated processor or implemented by a combination of software and a universal processor such as an application processor (AP), a central processing unit (CPU) or a graphic processing unit (GPU). Furthermore, in the case of the dedicated processor, it may include a memory for implementing an embodiment of the present disclosure or a memory processor for using an external memory.

The obtainer 510 and the predictive decoder 530 may be implemented by a plurality of processors. In this case, the obtainer 510 and the predictive decoder 530 may be implemented by a combination of dedicated processors or implemented by a combination of software and multiple universal processors such as APs, CPUs or GPUs.

The obtainer 510 may obtain a bitstream generated by neural network-based encoding of the current image 100. The bitstream may be generated by the intra prediction as described in connection with FIG. 1 or the inter prediction as described in connection with FIG. 2.

The obtainer 510 may receive the bitstream from an image encoding device 1400 over a network. In an embodiment, the obtainer 510 may obtain the bitstream from a data storage medium including a magnetic medium such as a hard disk, floppy disk and a magnetic tape, an optical recording medium such as a compact disk (CD) read only memory (ROM) (CD-ROM) and a digital versatile disc (DVD), a magneto-optical medium such as, for example, a floptical disk, or the like.

The obtainer 510 may obtain the dequantized first feature data from the bitstream.

The first feature data may include at least one of the feature data k of the current image 100 output from the image encoder 12, the feature data w of the optical flow g output from the optical flow encoder 42 or the feature data v of the residual image r output from the residual encoder 52.

In an embodiment, the obtainer 510 may obtain the second feature data for the first feature data from the bitstream, and use the second feature data to obtain the modified probability data and the quantization data. In addition, the obtainer 510 may obtain dequantized first feature data by entropy decoding and dequantization of bits included in the bitstream.

The dequantized first feature data may be forwarded to the predictive decoder 530, and the predictive decoder 530 may obtain the currently reconstructed image 300 by applying the dequantized first feature data to a neural network. The currently reconstructed image 300 may be output to a display device for playback.

In an embodiment, the predictive decoder 530 may obtain the currently reconstructed image 300 by applying the dequantized first feature data to the image decoder 14. In this case, the predictive decoder 530 may be understood as reconstructing the current image 100 through intra prediction.

In an embodiment, the predictive decoder 530 may obtain the optical flow g by applying the dequantized first feature data (e.g., the dequantized feature data of the optical flow g) to the optical flow decoder 44. The predictive decoder 530 may further obtain the reconstructed residual image r' by applying the dequantized feature data of the residual image r to the residual decoder 54. The predictive decoder 530 may obtain the currently reconstructed image 300 by combining the currently predicted image x' obtained from the previously reconstructed image 200 and the reconstructed residual image r' based on the optical flow g. In this case, the predictive decoder 530 may be understood as reconstructing the current image 100 through inter prediction.

Figure 6:
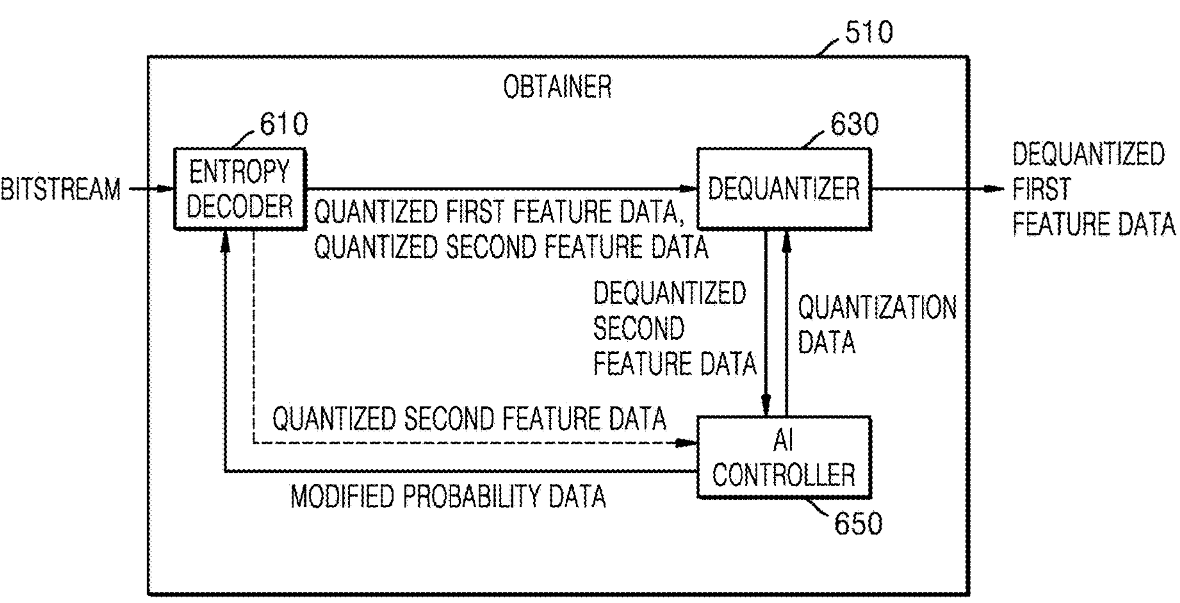
FIG. 6 is a diagram illustrating a configuration of an obtainer, according to an embodiment.

FIG. 6 is a diagram illustrating a configuration of the obtainer 510, according to an embodiment.

Referring to FIG. 6, the obtainer 510 may include an entropy decoder 610, a dequantizer 630 and an AI controller 650.

The bitstream may be input to the entropy decoder 610, and the entropy decoder 610 may obtain quantized second feature data by applying entropy decoding to bits included in the bitstream.

As described below, the second feature data may be obtained by the hyperprior encoder 310 processing the first feature data. The image encoding device 1400 may quantize the second feature data and entropy encode the quantized second feature data to generate a bitstream including bits corresponding to the quantized second feature data.

In an embodiment, quantization may not be applied to the second feature data. In this case, the entropy decoder 610 may obtain the second feature data by applying entropy decoding to the bits included in the bitstream, and forward the obtained second feature data to the AI controller 650.

The quantized second feature data may be forwarded to the dequantizer 630. The dequantizer 630 may dequantize the quantized second feature data and forward the dequantized second feature data to the AI controller 650.

In an embodiment, the quantized second feature data obtained by the entropy decoder 610 may be provided to the AI controller 650 from the entropy decoder 610. As such, the dequantization of the quantized second feature data may be skipped.

In an embodiment, the entropy decoder 610 may use predetermined probability data to obtain the second feature data (e.g., non-quantized second feature data or quantized second feature data) from the bitstream.

The probability data used to obtain the second feature data may be determined on a rule basis. For example, the entropy decoder 610 may determine the probability data used to obtain the second feature data according to a predefined rule without using any neural network.

In an embodiment, the entropy decoder 610 may obtain the probability data used to obtain the second feature data based on a pre-trained neural network.

In an embodiment, the dequantizer 630 may use predetermined quantization data to dequantize the quantized second feature data.

The quantization data used to obtain the second feature data may be determined on a rule basis. For example, the dequantizer 630 may determine the quantization data used to dequantize the quantized second feature data according to a predefined rule without using any neural network. For example, the dequantizer 630 may dequantize the quantized second feature data according to a predetermined quantization step size.

In an embodiment, the dequantizer 630 may dequantize sample values of the quantized second feature data according to the same quantization step size.

In an embodiment, the dequantizer 630 may obtain the quantization data used to dequantize the quantized second feature data based on a pre-trained neural network.

The AI controller 650 may use the second feature data (e.g., non-quantized second feature data, quantized second feature data or dequantized second feature data) to obtain modified probability data and quantization data.

In an embodiment, the AI controller 650 may use a neural network to obtain the modified probability data and the quantization data.

The modified probability data may be forwarded to the entropy decoder 610, and the quantization data may be forwarded to the dequantizer 630.

The entropy decoder 610 may obtain quantized first feature data by applying entropy decoding based on the modified probability data to bits included in the bitstream. The quantized first feature data may be forwarded to the dequantizer 630.

The dequantizer 630 may dequantize the quantized first feature data based on the quantization data forwarded from the AI controller 650, and forward the dequantized first feature data to the predictive decoder 530.

Figure 7:
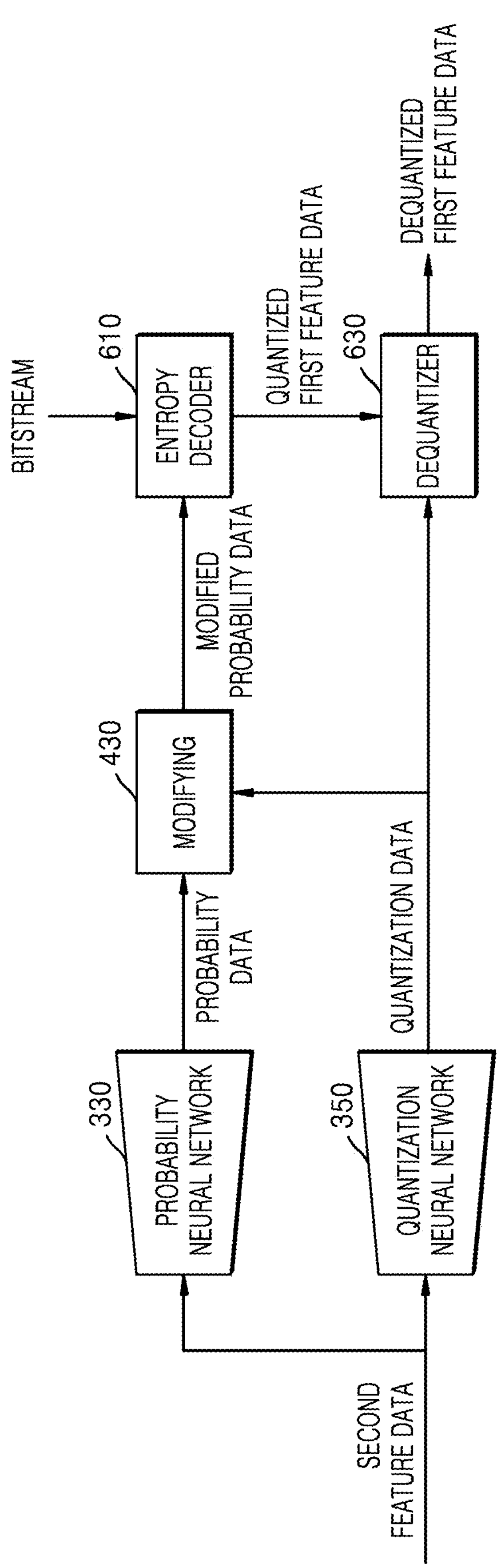
FIG. 7 is a diagram for describing operation of an artificial intelligence (AI) controller, according to an embodiment.

Referring to FIG. 7, operation of the AI controller 650 is described.

FIG. 7 is a diagram for describing operation of the AI controller 650, according to an embodiment.

The AI controller 650 may use the probability neural network 330 and the quantization neural network 350 to obtain the probability data and the quantization data.

The probability neural network 330 and the quantization neural network 350 may be stored in the memory. In an embodiment, the probability neural network 330 and the quantization neural network 350 may be implemented by an AI processor.

The second feature data (e.g., non-quantized second feature data, quantized second feature data or dequantized second feature data) may be input to the probability neural network 330 and the quantization neural network 350.

The probability neural network 330 may process the second feature data according to parameters configured as a result of training to output the probability data.

The quantization neural network 350 may process the second feature data according to parameters configured as a result of training to output the quantization data.

As described above in connection with FIG. 4, the second feature data is processed by the single neural network 410, so that the probability data and the quantization data may be output.

The quantization data may include quantization parameters or quantization step sizes, and the probability data may include values that represent probabilities of values that the samples of the first feature data are able to have. In an embodiment, the probability data may include an average, a standard deviation and/or a deviation for each sample of the first feature data for the sample.

In an embodiment, the size or the number of samples of the quantization data and the probability data may be equal to the size or the number of samples of the first feature data.

As described above, as the distribution of the sample values of the first feature data may be changed through adaptive quantization based on the quantization data, the probability data may be modified through the modifying procedure 400 based on the quantization data.

In an embodiment, the AI controller 650 may obtain modified probability data by dividing the sample values of the probability data by the sample values of the quantization data. The dividing is an example, and in an embodiment, the AI controller 650 may obtain the modified probability data by multiplying the sample values of the probability data by the sample values of the quantization data or values derived from the sample values of the quantization data.

In an embodiment, the AI controller 650 may also use a bit-shift operation to perform division operation or multiplication operation on the sample values of the probability data.

In an embodiment, the modifying procedure 430 may be performed based on a neural network as well. For example, as the probability data and the quantization data are applied to the neural network for the modifying procedure 430, modified probability data may be obtained.

The AI controller 650 may forward the modified probability data to the entropy decoder 610, and forward the quantization data to the dequantizer 630.

The entropy decoder 610 may obtain quantized first feature data by applying entropy decoding based on the modified probability data to the bits of the bitstream. The dequantizer 630 may dequantize the quantized first feature data according to the quantization data to obtain the dequantized first feature data.

Exemplary structures of the probability neural network 330, the quantization neural network 350, the neural network for the modifying procedure and the hyperprior encoder 310, as shown in FIG. 7, is described with reference to FIG. 8.

Figure 8:
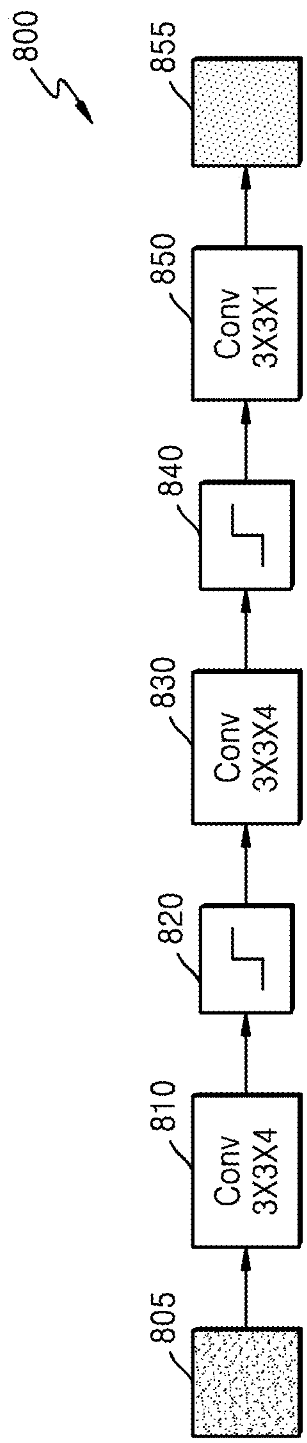
FIG. 8 is a diagram illustrating a structure of a neural network, according to an embodiment.

FIG. 8 is a diagram illustrating a structure of a neural network 800, according to an embodiment.

As shown in FIG. 8, an input data 805 may be input to a first convolution layer 810. "3×3×4" marked on the first convolution layer 810 indicates as an example that convolution on the input data 805 is performed by using four filter kernels each having a size of 3×3. As a result of the convolution process, four feature data may be generated by the four filter kernels.

In an embodiment, when the neural network 800 corresponds to a neural network for the modifying procedure, the input data 805 may include 2-channel data (e.g., the probability data and the quantization data).

In an embodiment, when the neural network 800 corresponds to the probability neural network 330 or the quantization neural network 350, the input data 805 may include the second feature data.

In an embodiment, when the neural network 800 corresponds to the hyperprior encoder 310, the input data 805 may include the first feature data.

Feature data generated by a first convolution layer 810 may represent unique features of the input data 805. For example, each feature data may represent a feature in the vertical direction, a feature in the horizontal direction or an edge feature of the input data 805.

The feature data of the first convolution layer 810 may be input to a first activation layer 820.

The first activation layer 820 may give non-linear characteristics to each feature data. The first activation layer 820 may include a sigmoid function, a tanh function, a rectified linear unit (ReLU) function, or the like, without being limited thereto.

The giving of the non-linear characteristics by the first activation layer 820 may refer to changing some sample values of the feature data and outputting the result. In this case, the changing may be performed by applying the non-linear characteristics.

The first activation layer 820 may determine whether to forward the sample values of the feature data to a second convolution layer 830. For example, some of the sample values of the feature data may be activated by the first activation layer 820 and forwarded to the second convolution layer 830, and some sample values may be inactivated by the first activation layer 820 and not forwarded to the second convolution layer 830. The unique characteristics of the input data 805 represented by the feature data may be emphasized by the first activation layer 820.

The feature data output from the first activation layer 820 may be input to the second convolution layer 830. "3×3×4" marked on the second convolution layer 830 indicates as an example that convolution on the input feature data is performed by using four filter kernels each having a size of 3×3.

The output of the second convolution layer 830 may be input to a second activation layer 840. The second activation layer 840 may give non-linear characteristics to the input feature data.

The feature data output from the second activation layer 840 may be input to a third convolution layer 850. "3×3×1" marked on the third convolution layer 850 indicates as an example that convolution is performed to produce one output data 855 by using one filter kernel having a size of 3×3.

The output data 855 varies depending on which one of the hyperprior encoder 310, the probability neural network 330, the quantization neural network 350 and a neural network for the modifying procedure is the neural network 800.

For example, in a case that the neural network 800 is the probability neural network 330, the output data 855 is the probability data, and in a case that the neural network 800 is the quantization neural network 350, the output data 855 may be the quantization data.

In an embodiment, the number of the output data 855 may be adjusted by adjusting the number of filter kernels used in the third convolution layer 850.

For example, when the neural network 800 is the probability neural network 330 and the probability data includes average data and standard deviation data, as described below, two filter kernels may be used for the third convolution layer 850 to output 2-channel data.

Furthermore, for example, when the neural network 800 is the probability neural network 330, the probability data includes average data and standard deviation data, as described below, and the number of channels of the first feature data is M, 2M filter kernels may be used in the third convolution layers 850 to output M average data and M standard deviation data.

Furthermore, for example, when the neural network 800 is the quantization neural network 350 and the number of channels of the first feature data is M, M filter kernels may be used in the third convolution layers 850 to output M quantization data.

The neural network 800 is shown in FIG. 8 as including three convolution layers (the first convolution layer 810, the second convolution layer 830 and the third convolution layer 850) and two activation layers (the first activation layer 820 and the second activation layer 840), however, it is merely an example and in an embodiment, the numbers of the convolution layers and activation layers included in the neural network 800 may be variously changed.

In an embodiment, the size and number of the filter kernels used in the convolution layers included in the neural network 800 may also be variously changed.

In an embodiment, the neural network 800 may be implemented by a recurrent neural network (RNN). Consequently, the CNN structure of the neural network 800 may be changed to an RNN structure.

In an embodiment, the image decoding device 500 and the image encoding device 1400 may include at least one arithmetic logic unit (ALU) for a convolution operation and an operation of the activation layer.

The ALU may be implemented by a processor. For the convolution operation, the ALU may include a multiplier for performing multiplication between sample values of the feature data output from the previous layer or the input data and sample values of the filter kernel, and an adder for adding the resultant values of the multiplication.

For the operation of the activation layer, the ALU may include a multiplier for multiplying a weight used in a predetermined Sigmoid function, Tanh function or ReLU function by the input sample value, and a comparator for determining whether to forward the input sample value to the next layer by comparing the multiplication result with a certain value.

The probability data used for entropy encoding and entropy decoding is described with reference to FIGS. 9 to 12.

Figure 9:
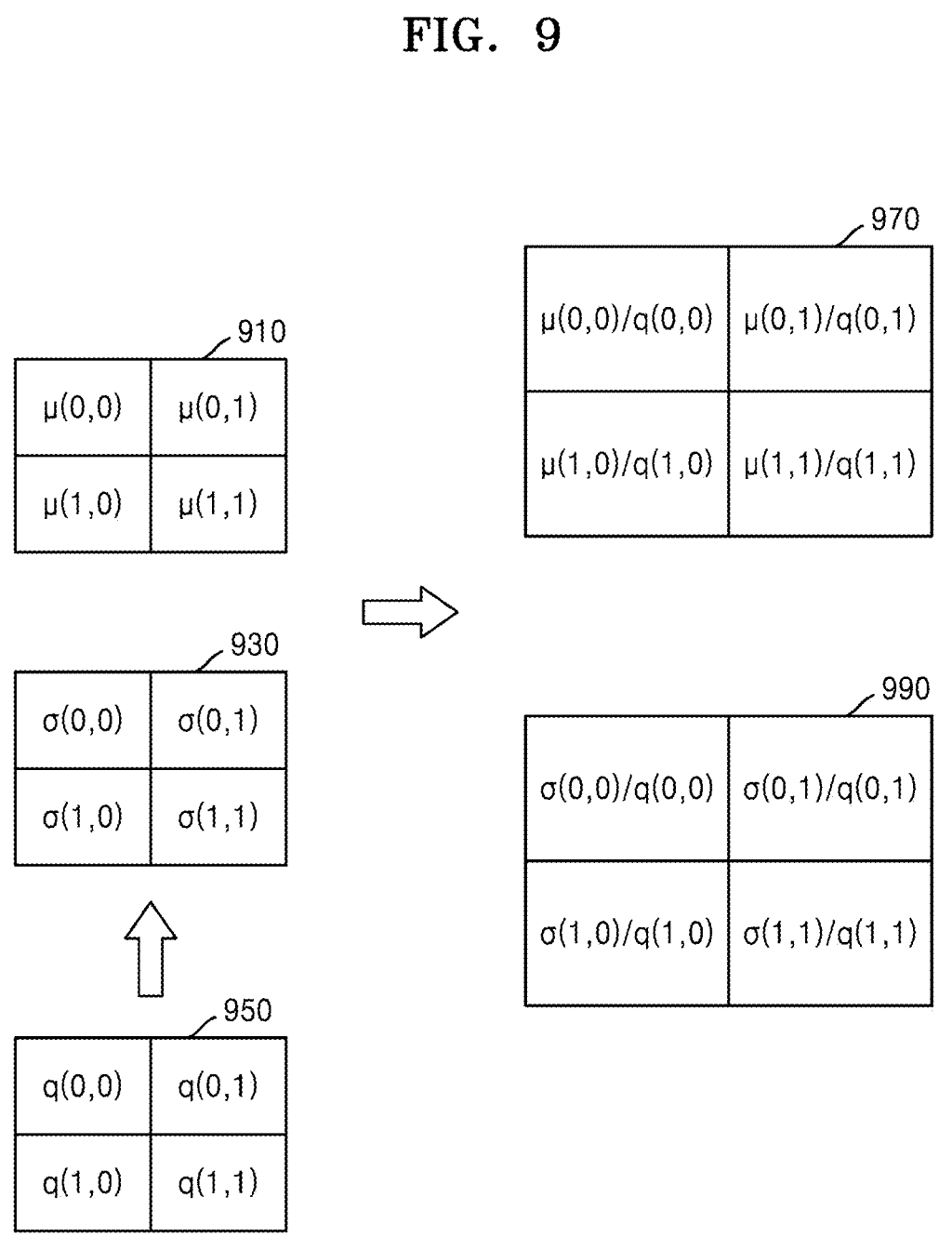

FIG. 9 is a diagram for describing a method of modifying probability data, according to an embodiment.

In an embodiment, the probability data output by the probability neural network 330 may represent probabilities of values that the samples of the first feature data are able to have.

In an embodiment, the probability data may include averages and standard deviations corresponding to the samples of the first feature data as samples. In this case, the probability data may include average data 910 including averages corresponding to the samples of the first feature data as samples and standard deviation data 930 including standard deviations corresponding to the samples of the first feature data as samples.

In an embodiment, the probability neural network 330 may include average data including averages corresponding to the samples of the first feature data as samples and deviation data including deviations corresponding to the samples of the first feature data as samples.

In an embodiment, the AI controller 650 may obtain modified probability data by dividing the sample values of the probability data by the sample values of the quantization data.

Referring to FIG. 9, the average data 910 may include sample values $\mu(0,0)$ to $\mu(1,1)$, the standard deviation data 930 may include sample values $\sigma(0,0)$ to $\sigma(1,1)$, and the quantization data 950 may include sample values q(0,0) to q(1,1). q(0,0) to q(1,1) of the quantization data 950 may be quantization step sizes. In FIG. 9, (a, b) may refer to a position of a sample in the data.

The AI controller 650 may obtain modified average data 970 including $\mu(0,0)/q(0,0)$ to $\mu(1,1)/q(1,1)$ as samples by dividing $\mu(0,0)$ to $\mu(1,1)$ in the average data 910 by q(0,0) to q(1,1) in the quantization data 950.

Furthermore, the AI controller 650 may obtain modified standard deviation data 990 including $\sigma(0,0)/q(0,0)$ to $\sigma(1,1)/q(1,1)$ as samples by dividing $\sigma(0,0)$ to $\sigma(1,1)$ in the standard deviation data 930 by q(0,0) to q(1,1) in the quantization data 950.

The dividing is an example, and in an embodiment, the AI controller 650 may obtain the modified average data 970 and the modified standard deviation data 990 by multiplying the sample values of the average data 910 and the standard average data 930 by the sample values of the quantization data 950 or values derived from the sample values of the quantization data 950.

In an embodiment, the AI controller 650 may also use a bit-shift operation to perform division operation or multiplication operation on the sample values of the average data 910 and the standard deviation data 930.

The AI controller 650 may derive probability values that the samples of the quantized first feature data are able to have according to the quantization data 950 by applying the sample values of the modified average data 970 and the sample values of the modified standard deviation data 990 to a predetermined probability model.

The reason for dividing the sample values of the average data 910 and the sample values of the standard deviation data 930 by the sample values of the quantization data 950 is that, when the sample value of the first feature data is divided and the resultant value of the division is rounded based on the quantization data 950, the sample value of the first feature data increases or decreases depending on the magnitude of the quantization step size, and the probability model (e.g., a probability density function) for the first feature data needs to be changed accordingly. Hence, a probability model that is suitable for the quantized first feature data may be derived by downscaling the average data 910 and the standard deviation data 930 according to the quantization data 950.

FIG. 10 is a diagram for describing probability data, modified probability data and a probability model, according to an embodiment.

Referring to FIG. 10, the probability data may include an average $\mu_a$ and a standard deviation $\sigma_a$, and as the average $\mu_a$ and the standard deviation $\sigma_a$ of the probability data are divided by a quantized step size q of the quantization data, the modified probability data may include a modified average $\mu_b$ and a modified standard deviation $\sigma_b$.

The AI controller 650 may determine a probability of a value that a sample of the quantized first feature data is able to have by applying the modified average $\mu_b$ and the modified standard deviation $\sigma_b$ to a predetermined probability model.

Referring to FIG. 10, for the predetermined probability model, a Laplacian probability model or a Gaussian model may be used.

The Laplacian probability model or the Gaussian probability model shown in FIG. 10 is an example. In an embodiment, there may be various types of probability models to be used in entropy encoding and entropy decoding.

The probability model that is to be used for entropy encoding and entropy decoding of the first feature data may be determined in advance. For example, a type of the probability model to be used for entropy encoding may be determined by the image encoding device 1400 in advance.

In an embodiment, a type of the probability model to be used for entropy encoding may be separately determined for each image or each block included in the image.

In the case of using the Laplacian model for entropy encoding, the AI controller 650 may derive a probability that a sample of the quantized first feature data is able to have by applying the modified average $\mu_b$ and the modified standard deviation $\sigma_b$ to the Laplacian probability model.

Furthermore, in the case of using the Gaussian model for entropy encoding, the AI controller 650 may derive a probability that a sample of the quantized first feature data is able to have by applying the modified average $\mu_b$ and the modified standard deviation $\sigma_b$ to the Gaussian probability model.

In an embodiment, the probability neural network 330 may output a plurality of probability data and a plurality of weight data as a result of processing the second feature data.

In an embodiment, each of the plurality of probability data may include average data and standard deviation data. In an embodiment, each of the plurality of probability data may include average data and deviation data.

The AI controller 650 may modify the plurality of probability data according to the quantization data to obtain a plurality of modified probability data.

As the plurality of modified probability data are combined according to the plurality of weight data, a probability that a sample of the quantized first feature data is able to have may be derived.

FIG. 11 is a diagram for describing a method of modifying a plurality of probability data, according to an embodiment.

Referring to FIG. 11, N average data 910 (e.g., a first average data 910-1, a second average data 910-2, to N-th average data 910-N) may be obtained from the probability neural network 330. In an embodiment, N standard deviation data and N weight data may also be obtained from the probability neural network 330.

A size or the sample number of the N average data 910, the N standard deviation data and the N weight data may be equal to the size or the sample number of the first feature data.

In an embodiment, when the number of the first feature data (or channel number) is M, M×N average data, M×N standard deviation data and M×N weight data may be obtained from the probability neural network 330.

The AI controller 650 may obtain N modified average data 970 (e.g., a first modified average data 970-1, a second modified average data 970-2, to N-th modified average data 970-N) by dividing sample values of the N average data 910 by sample values of the quantization data 950.

The AI controller 650 may obtain N modified standard deviation data by dividing sample values of the N standard deviation data by the sample values of the quantization data 950.

FIG. 12 is a diagram for describing probability data, modified probability data and a probability model, according to an embodiment.

Referring to FIG. 12, when N average data $\mu_a$, N standard deviation data $\sigma_a$ and N weight data w are obtained from the probability neural network 330, the AI controller 650 may obtain N modified average data $\mu_b$ and N modified standard deviation data $\sigma_b$ by dividing the N average data $\mu_a$ and N standard deviation data $\sigma_a$ by the sample values of the quantization data q.

In an embodiment, the N average data $\mu_a$ shown in FIG. 12 may include the N average data 910 as shown in FIG. 11. For example, $\mu_{a1}$ of FIG. 12 may correspond to the first average data 910-1 of FIG. 11. Furthermore, for example, $\mu_{b1}$ of FIG. 12 may correspond to the first modified average data 970-1 that is a result of dividing $\mu_{a1}$ by the quantization data 950.

The AI controller 650 may derive probabilities of values that samples of the quantized first feature data are able to have by applying the N modified average data $\mu_b$, the N modified standard deviation data $\sigma_b$ and the N weight data w to the predetermined probability model (e.g., the Laplacian probability model or the Gaussian probability model shown in FIG. 12).

In an embodiment, as the N modified average data $\mu_b$ and the N modified standard deviation data $\sigma_b$ are obtained for one first feature data, and the N modified average data $\mu_b$ and the N modified standard deviation data $\sigma_b$ are combined according to the N weight data w, the probability that a sample of the first feature data is able to have may be derived more accurately and stably.

Figure 13:
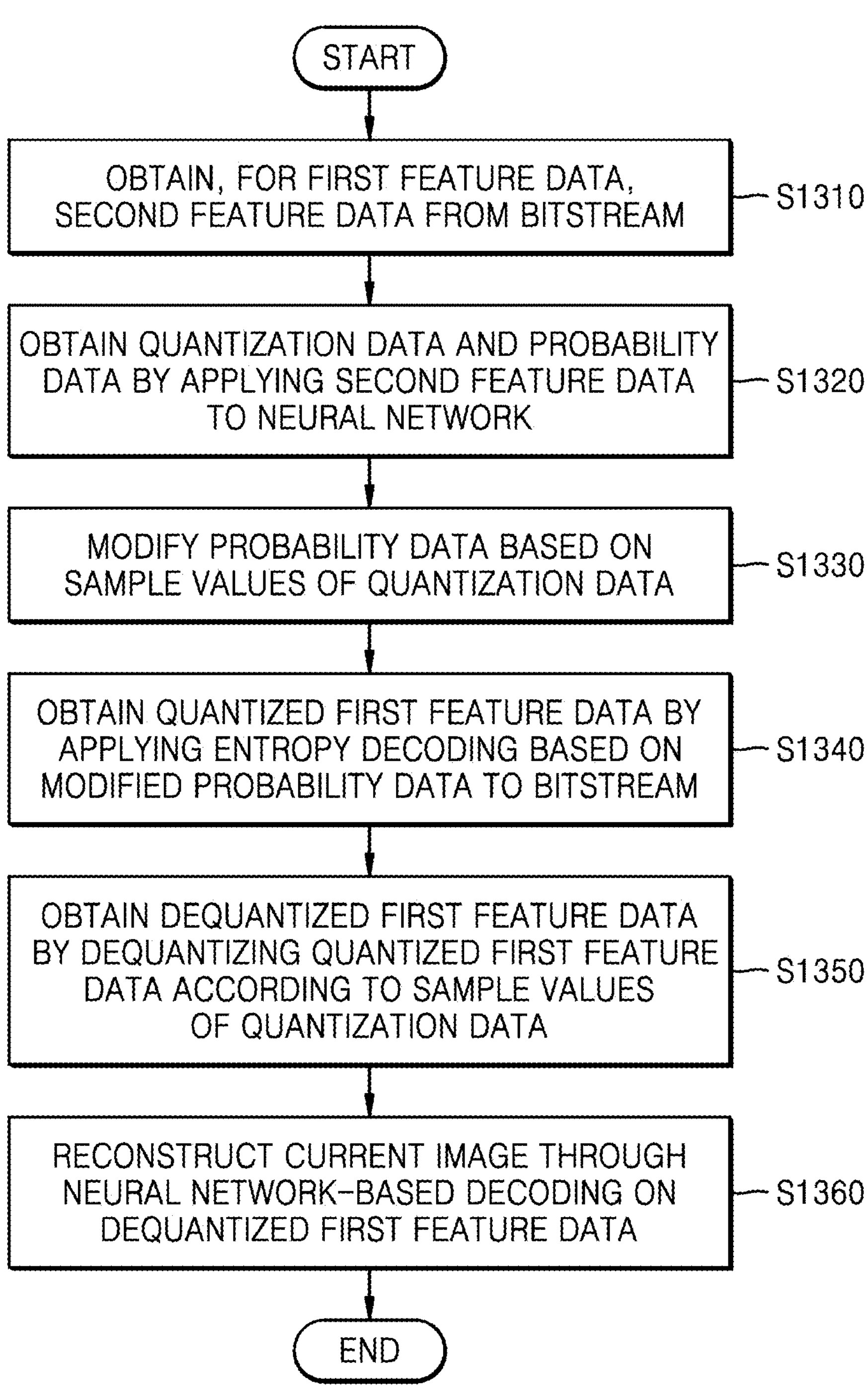
FIG. 13 is a diagram for describing an image decoding method according to an embodiment.

FIG. 13 is a diagram for describing an image decoding method, according to an embodiment.

In operation S1310, the image decoding device 500 may obtain, for first feature data obtained by neural network-based encoding of the current image 100, second feature data from a bitstream.

In an embodiment, the first feature data may include the feature data k obtained by applying the current image 100 to the image encoder 12, the feature data w obtained by applying the current image 100 and the previously reconstructed image 200 to the optical flow encoder 42 or the feature data v obtained by applying the residual image r corresponding to the current image 100 to the residual encoder 52.

In an embodiment, the image decoding device 500 may obtain the second feature data by applying entropy decoding to bits included in the bitstream.

In an embodiment, the image decoding device 500 may obtain quantized second feature data by applying entropy decoding to the bits included in the bitstream, and dequantize the quantized second feature data.

In operation S1320, the image decoding device 500 obtains quantization data and probability data by applying the second feature data to a neural network.

In an embodiment, the neural network may include the probability neural network 330 that outputs probability data and the quantization neural network 350 that outputs quantization data.

In operation S1330, the image decoding device 500 modifies the probability data based on sample values of the quantization data.

In an embodiment, the image decoding device 500 may divide the sample values of the probability data by the sample values of the quantization data. In this case, the sample values of the quantization data may be quantization step sizes. When the sample values of the quantization data correspond to quantization parameters, the image decoding device 500 may determine the quantization step sizes from the quantization parameters, and divide the sample values of the probability data by the determined quantization step sizes.

In operation S1340, the image decoding device 500 obtains quantized first feature data by applying entropy decoding based on the modified probability data to bits included in the bitstream.

In operation S1350, the image decoding device 500 obtains dequantized first feature data by dequantizing the quantized first feature data according to the sample values of the quantization data.

In operation S1360, the image decoding device 500 reconstructs the current image 100 by neural network-based decoding of the dequantized first feature data.

In an embodiment, the image decoding device 500 may reconstruct the current image 100 by applying the dequantized first feature data to the image decoder 14, the optical flow decoder 44 and/or the residual decoder 54.

Figure 14:
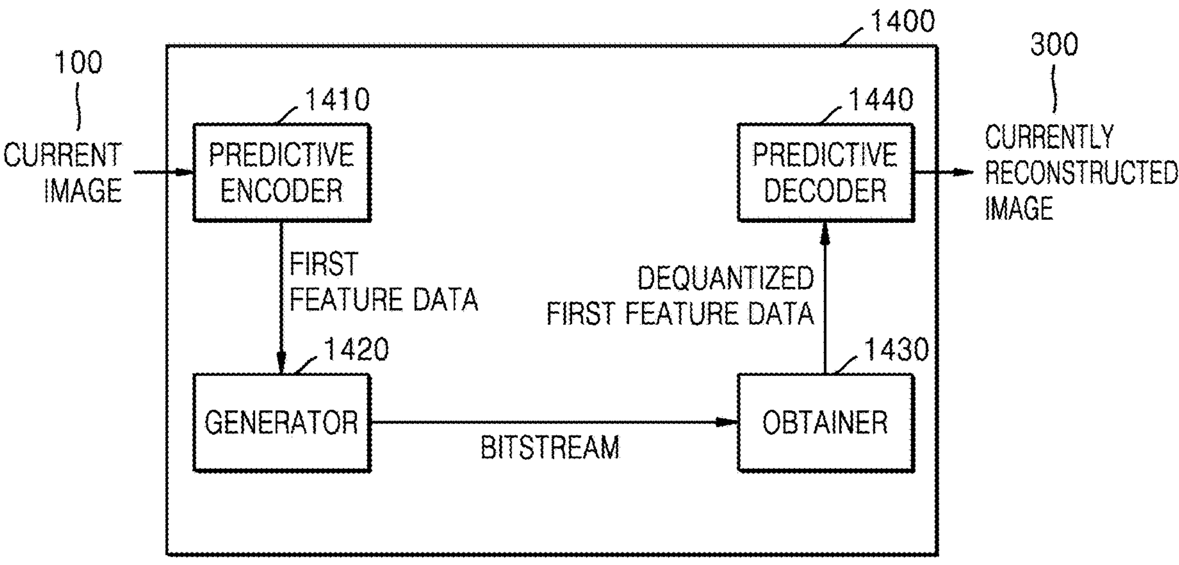
FIG. 14 is a diagram illustrating a configuration of an image encoding device, according to an embodiment.

FIG. 14 is a diagram illustrating a configuration of the image encoding device 1400, according to an embodiment.

Referring to FIG. 14, the image encoding device 1400 may include a predictive encoder 1410, a generator 1420, an obtainer 1430 and a predictive decoder 1440.

The predictive encoder 1410, the generator 1420, the obtainer 1430 and the predictive decoder 1440 may be implemented by a processor. The predictive encoder 1410, the generator 1420, the obtainer 1430 and the predictive decoder 1440 may operate according to instructions stored in a memory.

The predictive encoder 1410, the generator 1420, the obtainer 1430 and the predictive decoder 1440 are shown separately in FIG. 14, however, the predictive encoder 1410, the generator 1420, the obtainer 1430 and the predictive decoder 1440 may be implemented by one processor. In this case, the predictive encoder 1410, the generator 1420, the obtainer 1430 and the predictive decoder 1440 may be implemented by a dedicated processor or implemented by a combination of software and a universal processor such as an AP, a CPU or a GPU. Furthermore, in the case of the dedicated processor, it may include a memory for implementing an embodiment of the present disclosure or a memory processor for using an external memory.

The predictive encoder 1410, the generator 1420, the obtainer 1430 and the predictive decoder 1440 may be implemented by a plurality of processors as well. In this case, the predictive encoder 1410, the generator 1420, the obtainer 1430 and the predictive decoder 1440 may be implemented by a combination of dedicated processors or implemented by a combination of software and multiple universal processors such as APs, CPUs or GPUs.

The predictive encoder 1410 may obtain the first feature data by applying neural network-based encoding to the current image 100. The first feature data may include at least one of the feature data k of the current image 100, the feature data w of the optical flow g or the feature data v of the residual image r.

In an embodiment, the predictive encoder 1410 may obtain the feature data k of the current image 100 by applying the current image 100 to the image encoder 12.

In an embodiment, the predictive encoder 1410 may obtain the feature data w of the optical flow g by applying the current image 100 and the previously reconstructed image 200 to the optical flow encoder 42.

In an embodiment, the predictive encoder 1410 may obtain the feature data v of the residual image r by applying the residual image r corresponding to a difference between the currently predicted image x' and the current image 100 to the residual encoder 52.

The first feature data obtained by the predictive encoder 1410 may be forwarded to the generator 1420.

The generator 1420 may generate a bitstream based on the first feature data.

In an embodiment, the generator 1420 may obtain the second feature data that represents a latent feature of the first feature data, and apply the second feature data to a neural network to obtain quantization data and modified probability data. Furthermore, the generator 1420 may quantize the first feature data according to the quantization data, and entropy encode the quantized first feature data according to the modified probability data to generate a bitstream.

In an embodiment, the generator 1420 may generate the bitstream by entropy encoding the second feature data or the quantized second feature data according to predetermined probability data.

In an embodiment, the bitstream may include bits corresponding to the quantized first feature data, and bits corresponding to the second feature data or the quantized second feature data.

The bitstream may be transmitted from the image decoding device 500 over the network. In an embodiment, the bitstream may be recorded in a data storage medium including a magnetic medium such as a hard disk, floppy disk and a magnetic tape, an optical recording medium such as a CD-ROM and a DVD, a magneto-optical medium such as floptical disk, or the like.

The obtainer 1430 may obtain the dequantized first feature data from the bitstream generated by the generator 1420.

The dequantized first feature data may be forwarded to the predictive decoder 1440.

The predictive decoder 1440 may obtain the currently reconstructed image 300 by applying neural network-based decoding to the dequantized first feature data.

Configurations and operations of the obtainer 1430 and the predictive decoder 1440 may be equal to the obtainer 510 and the predictive decoder 530 of the image decoding device 500.

Figure 15:
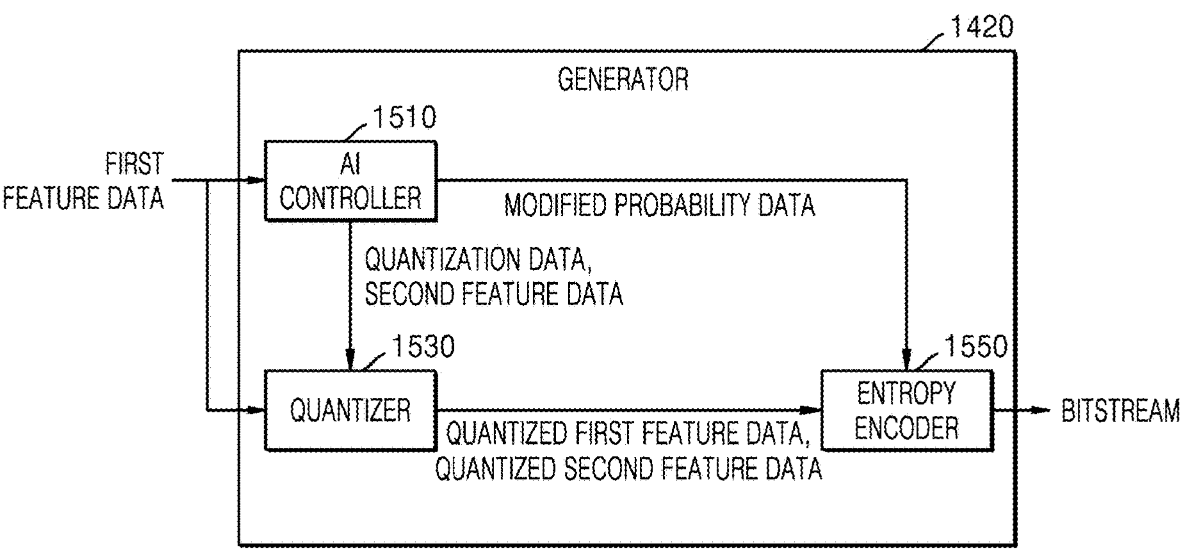
FIG. 15 is a diagram illustrating a configuration of a generator, according to an embodiment.

FIG. 15 is a diagram illustrating a configuration of the generator 1420, according to an embodiment.

Referring to FIG. 15, the generator 1420 may include an AI controller 1510, a quantizer 1530 and an entropy encoder 1550.

The first feature data obtained by the predictive encoder 1410 may be forwarded to the AI controller 1510 and the quantizer 1530.

The AI controller 1510 may obtain the second feature data from the first feature data, and obtain quantization data and modified probability data based on the second feature data. The second feature data and the quantization data may be forwarded to the quantizer 1530, and the modified probability data may be forwarded to the entropy encoder 1550.

In an embodiment, the AI controller 1510 may obtain the quantization data and the modified probability data based on the second feature data to which quantization and dequantization are applied. For the quantization and dequantization of the second feature data, predetermined quantization data (e.g., quantization data determined on a rule basis) may be used.

The quantizer 1530 may quantize the first feature data according to the quantization data generated based on a neural network to obtain quantized first feature data.

In an embodiment, the quantizer 1530 may quantize the second feature data according to the quantization data generated on a rule basis to obtain quantized second feature data. In an embodiment, the second feature data may be forwarded to the entropy encoder 1550 from the AI controller 1510. As such, the quantization of the second feature data may be skipped.

The quantizer 1530 may forward the quantized first feature data and the quantized second feature data to the entropy encoder 1550.

The entropy encoder 1550 may generate a bitstream by entropy encoding the quantized first feature data according to the modified probability data.

In an embodiment, the entropy encoder 1550 may generate the bitstream by entropy encoding the second feature data or the quantized second feature data according to predetermined probability data.

The bitstream may include bits corresponding to the quantized first feature data, and bits corresponding to the second feature data or the quantized second feature data.

Figure 16:
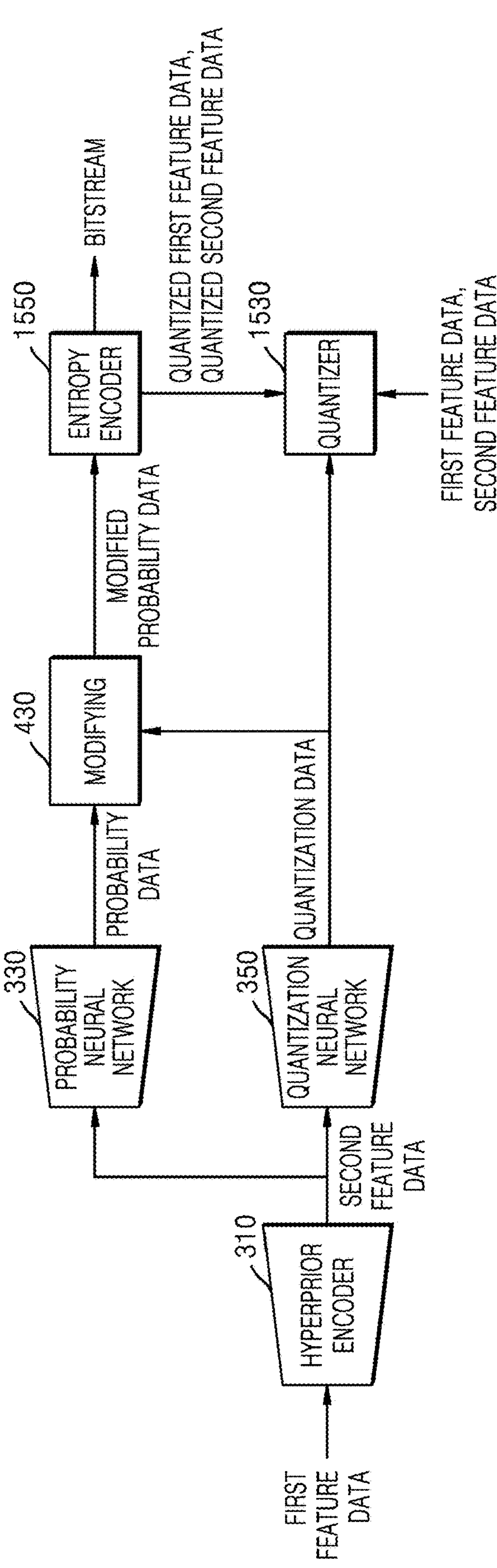
FIG. 16 is a diagram for describing operation of an AI controller, according to an embodiment.

Referring to FIG. 16, operation of an AI controller 1510 is described.

FIG. 16 is a diagram for describing operation of the AI controller 1510, according to an embodiment.

The AI controller 1510 may use the hyperprior encoder 310, the quantization neural network 350 and the probability neural network 330.

The hyperprior encoder 310, the quantization neural network 350 and the probability neural network 330 may be stored in the memory. In an embodiment, the hyperprior encoder 310, the quantization neural network 350 and the probability neural network 330 may be implemented by an AI processor.

Referring to FIG. 16, the first feature data may be input to the hyperprior encoder 310.

The hyperprior encoder 310 may process the first feature data according to parameters configured as a result of training to obtain the second feature data. The second feature data may be input to the probability neural network 330 and the quantization neural network 350.

In an embodiment, the second feature data to which quantization and dequantization are applied may be input to the probability neural network 330 and the quantization neural network 350. The reason for quantizing and dequantizing the second feature data is to consider an occasion when the bitstream forwarded to the image decoding device 500 includes the quantized second feature data. In other words, as the image decoding device 500 may use the dequantized second feature data to obtain the probability data and the quantization data, the image encoding device 1400 also uses the second feature data to which quantization and dequantization are applied in the same way as in the image decoding device 500.

The probability neural network 330 may process the second feature data according to parameters configured as a result of training to output the probability data.

The quantization neural network 350 may process the second feature data according to parameters configured as a result of training to output the quantization data.

As described above in connection with FIG. 4, the second feature data is processed by the single neural network 410, so that the probability data and the quantization data may be output.

The quantization data may include quantization parameters or quantization step sizes, and the probability data may include values that represent probabilities of values that the samples of the first feature data are able to have. In an embodiment, the probability data may include an average, a standard deviation and/or a deviation for each sample of the first feature data for the sample.

In an embodiment, the size or the number of samples of the quantization data and the probability data may be equal to the size or the number of samples of the first feature data.

In an embodiment, the probability data may be modified through the modifying procedure 430 based on the quantization data.

In an embodiment, the AI controller 1510 may obtain modified probability data by dividing the sample values of the probability data by the sample values of the quantization data. The dividing is an example, and in an embodiment, the AI controller 1510 may obtain the modified probability data by multiplying the sample values of the probability data by the sample values of the quantization data or values derived from the sample values of the quantization data.

In an embodiment, the AI controller 1510 may also use a bit-shift operation to perform division operation or multiplication operation on the sample values of the probability data.

In an embodiment, the modifying procedure 430 may be performed based on a neural network as well. For example, as the probability data and the quantization data are applied to the neural network for the modifying procedure 430, modified probability data may be obtained.

The AI controller 1510 may forward the modified probability data to the entropy encoder 1550, and forward the quantization data to the quantizer 1530.

The quantizer 1530 may quantize the first feature data according to the quantization data to obtain the quantized first feature data. Furthermore, the quantizer 1530 may quantize the second feature data to obtain the second feature data.

In an embodiment, the quantizer 1530 may use predetermined quantization data to quantize the second feature data. The quantization data used to quantize the second feature data may be determined on a rule basis. In other words, the quantizer 1530 may determine the quantization data used to quantize the second feature data according to a predefined rule without using any neural network. For example, the quantizer 1530 may quantize the second feature data according to a predetermined quantization step size. In an embodiment, the quantizer 1530 may quantize sample values of the second feature data according to the same quantization step size.

The entropy encoder 1550 may generate a bitstream by applying entropy encoding based on the modified probability data to the quantized first feature data. Furthermore, the entropy encoder 1550 may entropy encode the second feature data or the quantized second feature data.

In an embodiment, the entropy encoder 1550 may use predetermined probability data to apply entropy encoding to the second feature data or the quantized second feature data. The probability data used to entropy encode the second feature data or the quantized second feature data may be determined on a rule basis. In other words, the entropy encoder 1550 may determine the probability data used to entropy encode the second feature data or the quantized second feature data according to a predefined rule without using any neural network.

Figure 17:
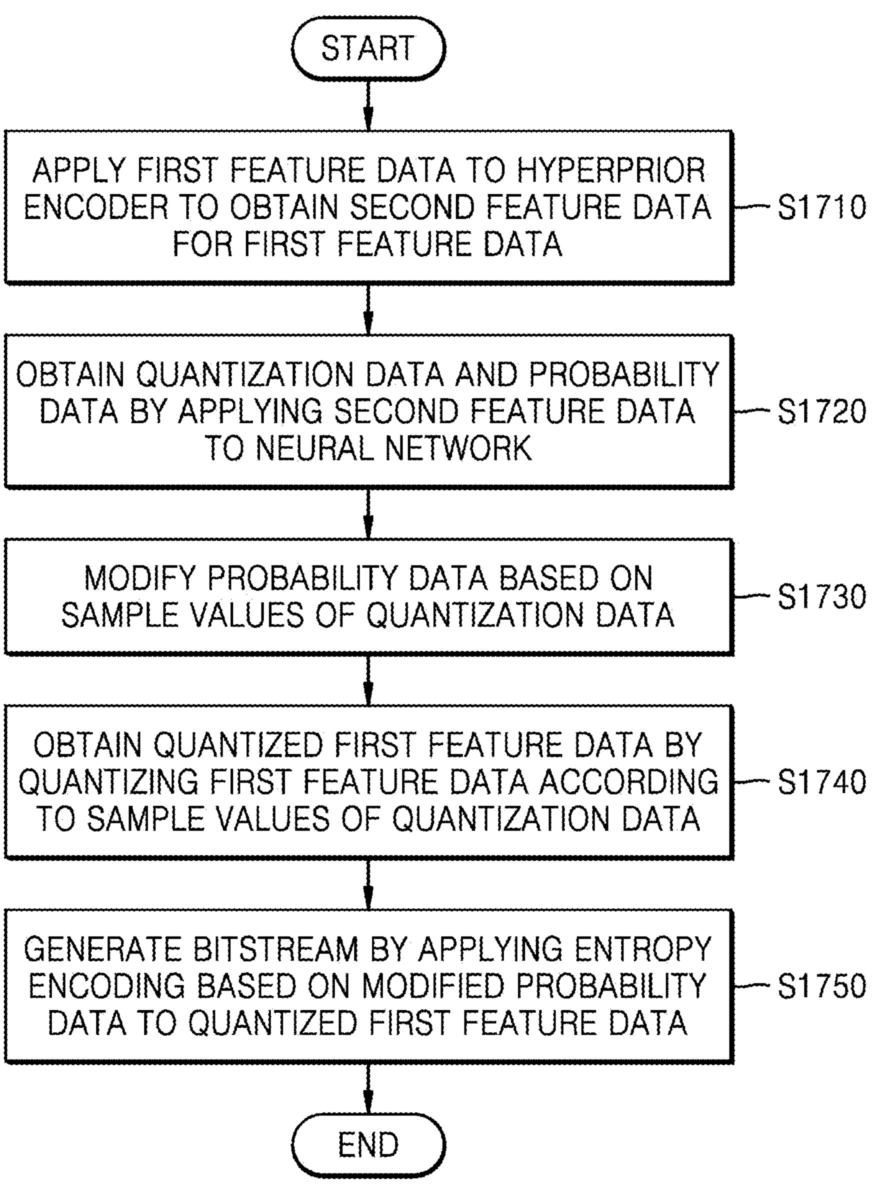
FIG. 17 is a diagram for describing an image encoding method according to an embodiment.

FIG. 17 is a diagram for describing an image encoding method, according to an embodiment of the present disclosure.

In operation S1710, the image encoding device 1400 applies the first feature data obtained by neural network-based encoding of the current image 100 to the hyperprior encoder 310 to obtain the second feature data for the first feature data.

In operation S1720, the image encoding device 1400 applies the second feature data to a neural network (e.g., the probability neural network 330 and the quantization neural network 350) to obtain quantization data and probability data.

In an embodiment, the image encoding device 1400 may apply the quantized or dequantized second feature data to the neural network to obtain the quantization data and the probability data.

In operation S1730, the image encoding device 1400 modifies the probability data based on sample values of the quantization data.

In an embodiment, the image encoding device 1400 may divide the sample values of the probability data by the sample values of the quantization data. In this case, the sample values of the quantization data may be quantization step sizes. When the sample values of the quantization data correspond to quantization parameters, the image encoding device 1400 may determine the quantization step sizes from the quantization parameters, and divide the sample values of the probability data by the determined quantization step sizes.

In operation S1740, the image encoding device 1400 may obtain quantized first feature data by quantizing the first feature data according to the sample values of the quantization data.

In an embodiment, the image encoding device 1400 may quantize the second feature data according to predetermined quantization data to obtain quantized second feature data.

In operation S1750, the image encoding device 1400 may generate a bitstream including bits corresponding to the quantized first feature data by applying entropy encoding based on the modified probability data to the quantized first feature data.

In an embodiment, the image encoding device 1400 may entropy encode non-quantized second feature data or the quantized second feature data according to predetermined probability data. In this case, the bitstream may include bits corresponding to the quantized first feature data, and bits corresponding to the non-quantized second feature data or the quantized second feature data.

How to train the aforementioned neural networks, the hyperprior encoder 310, the probability neural network 330 and the quantization neural network 350 is described with reference to FIG. 18.

FIG. 18 is a diagram for describing a method of training neural networks, according to an embodiment.

Referring to FIG. 18, a current training image may correspond to the aforementioned current image 100, and a current reconstructed training image may correspond to the aforementioned currently reconstructed image 300.

In a training procedure according to an embodiment, neural networks may be trained such that the current reconstructed training image is as similar as possible to the current training image and the bitrate of the bitstream generated by encoding the current training image is minimized. For this, as shown in FIG. 1, first loss information 1880 and second loss information 1890 may be used to train the neural networks.

In the procedure for training the neural networks, the first feature data may be obtained first by applying a neural network-based encoding procedure 1810 to the current training image.

The neural network-based encoding procedure 1810 may be a procedure for encoding the current training image based on the image encoder 12, the optical flow encoder 42 and/or the residual encoder 52.

The first feature data may include at least one of feature data obtained by processing the current training image by the image encoder 12, feature data obtained by processing the current training image and a previous reconstructed training image by the optical flow encoder 42 or feature data obtained by processing a residual training image corresponding to a difference between the current training image and a currently predictive training image by the residual encoder 52. The currently predictive training image may be obtained by modifying the previous reconstructed training image according to the optical flow g.

The first feature data may be input to the hyperprior encoder 310. The hyperprior encoder 310 may process the first feature data according to preconfigured parameters to output the second feature data.

The second feature data may be input to the probability neural network 330 and the quantization neural network 350. Each of the probability neural network 330 and the quantization neural network 350 may process the second feature data according to the preconfigured parameters to output probability data and quantization data.

The probability data may be modified through the modifying procedure 1820 based on the quantization data. The modifying procedure 1820 has been described in reference with FIGS. 9 to 12, thus, repeated may be omitted for the sake of brevity.

The quantization procedure 1830 based on the quantization data is applied to the first feature data to obtain quantized first feature data. Furthermore, the entropy encoding procedure 1840 based on the modified probability data may be applied to the quantized first feature data to generate a bitstream.

In an embodiment, the bitstream may include bits corresponding to the second feature data or the quantized second feature data.

Quantized first feature data may be obtained by performing an entropy decoding procedure 1850 based on the modified probability data on the bitstream, and dequantized first feature data may be obtained by performing a dequantization procedure 1860 according to the quantization data on the quantized first feature data.

The current reconstructed training image may be obtained by processing the dequantized first feature data according to a neural network-based decoding procedure 1870.

The neural network-based decoding procedure may be a procedure for decoding the current image 100 based on the image decoder 14, the optical flow decoder 44 and/or the residual decoder 54.

To train the neural network used in the neural network-based encoding procedure, the hyperprior encoder 310, the probability neural network 330, the quantization neural network 350 and the neural network used in the neural network-based decoding procedure, at least one of the first loss information 1880 or the second loss information 1890 may be obtained.

The first loss information 1880 may be calculated from the bitrate of the bitstream generated as a result of encoding the current training image.

The first loss information 1880 is related to coding efficiency for the current training image, so the first loss information may be referred to as compression loss information.

The second loss information 1890 may correspond to a difference between the current training image and the current reconstructed training image. In an embodiment, the difference between the current training image and the current reconstructed training image may include at least one of L1-norm value, L2-norm value, structural similarity (SSIM) value, peak signal-to-noise ratio-human vision system (PSNR-HVS) value, multiscale SSIM (MS-SSIM) value, variance inflation factor (VIF) value or video multimethod assessment fusion (VMAF) value.

The second loss information 1890 is related to the quality of the current reconstructed training image, and thus, may be referred to as the quality loss information.

The neural network used in the neural network-based encoding procedure, the hyperprior encoder 310, the probability neural network 330, the quantization neural network 350 and the neural network used in the neural network-based decoding procedure may be trained such that final loss information derived from at least one of the first loss information 1880 or the second loss information 1890 may be reduced or minimized.

In an embodiment, the neural network used in the neural network-based encoding procedure, the hyperprior encoder 310, the probability neural network 330, the quantization neural network 350 and the neural network used in the neural network-based decoding procedure may reduce or minimize the final loss information by changing values of the preconfigured parameters.

In an embodiment, the final loss information may be may be represented as an equation similar to Equation 2.

$$\text{Final loss information} = a \times \text{first loss information} + b \times \text{second loss information} \quad \text{[Equation 2]}$$

Referring to Equation 2, a and b may represent weights applied to the first loss information 1880 and the second loss information 1890, respectively.

According to Equation 2, it may be understood that the neural network used in the neural network-based encoding procedure, the hyperprior encoder 310, the probability neural network 330, the quantization neural network 350 and the neural network used in the neural network-based decoding procedure are trained to make the current reconstructed training image as similar as possible to the current training image and reduce the size of the bitstream.

The training procedure as described in connection with FIG. 18 may be performed by a training device. The training device may be, for example, the image encoding device 1400 or a separate server. Parameters obtained as a result of the training may be stored in the image encoding device 1400 and the image decoding device 500.

The image encoding device 1400, the image decoding device 500 and methods thereby according to an embodiment aim to efficiently quantize/dequantize the feature data generated by AI based encoding for images.

The image encoding device 1400, the image decoding device 500 and methods thereby according to an embodiment aim to reduce the bitrate of the bitstream generated as a result of encoding an image and improve the quality of the reconstructed image.

The image encoding device 1400, the image decoding device 500 and methods thereby according to an embodiment aim to improve efficiency of entropy coding.

The image encoding device 1400, the image decoding device 500 and methods thereby according to an embodiment aim to provide an AI based end-to-end encoding/decoding system.

According to an embodiment, an image decoding method may include obtaining, for first feature data obtained by neural network-based encoding of the current image 100, second feature data from a bitstream, in operation S1310.

In an embodiment, the image decoding method may include obtaining quantization data and probability data by applying the second feature data to a neural network 330, 350 or 410, in operation S1320.

In an embodiment, the image decoding method may include modifying probability data based on sample values of the quantization data, in operation S1330.

In an embodiment, the image decoding method may include obtaining quantized first feature data by applying entropy decoding based on the modified probability data for bits included in the bitstream, in operation S1340.

In an embodiment, the image decoding method may include obtaining dequantized first feature data by dequantizing the quantized first feature data according to the sample values of the quantization data, in operation S1350.

In an embodiment, the image decoding method may include reconstructing the current image by neural network-based decoding of the dequantized first feature data, in operation S1360.

In an embodiment, the quantization data may include a quantization parameter or a quantization step size as a sample.

In an embodiment, the sample values of the modified probability data may represent probabilities of values that the samples of the quantized first feature data are able to have.

In an embodiment, the sample value of the modified probability data may represent an average and a standard deviation corresponding to a sample of the quantized first feature data.

In an embodiment, probabilities of values that samples of the quantized first feature data are able to have may be derived by applying the average and standard deviation represented by the sample value of the modified probability data to a predetermined probability model.

In an embodiment, the modifying of the probability data may include dividing the sample values of the probability data by the sample values of the quantization data.

In an embodiment, the first feature data may include the feature data k obtained by applying the current image 100 to the image encoder 12, the feature data w obtained by applying the current image 100 and the previously reconstructed image 200 to the optical flow encoder 42 or the feature data v obtained by applying the residual image r corresponding to the current image 100 to the residual encoder 52.

In an embodiment, the neural network 330, 350 or 410 may be trained based on at least one of the bitrate of the bitstream or a difference between the current training image and the current reconstructed training image.

In an embodiment, a plurality of probability data and a plurality of weights may be obtained by applying the second feature data to the neural network 330 or 410, the plurality of probability data may be modified based on sample values of the quantization data, and a probability of a value that a sample of the quantized first feature data is able to have may be determined by combining the plurality of modified probability data according to the plurality of weights.

According to an embodiment, an image encoding method may include applying first feature data obtained by neural network-based encoding of the current image 100 to the first neural network to obtain second feature data for the first feature data, in operation S1710.

In an embodiment, the image encoding method may include obtaining quantization data and probability data by applying the second feature data to the second neural network 330, 350 or 410, in operation S1720.

In an embodiment, the image encoding method may include modifying the probability data based on sample values of the quantization data, in operation S1730.

In an embodiment, the image encoding method may include obtaining quantized first feature data by quantizing the first feature data according to the sample values of the quantization data, in operation S1740.

In an embodiment, the image encoding method may include generating a bitstream including bits corresponding to the quantized first feature data by applying entropy encoding based on the modified probability data to the quantized first feature data, in operation S1750.

In an embodiment, the bitstream may include bits corresponding to the second feature data.

In an embodiment, the second neural network 330, 350 or 410 may include the quantization neural network 350 for outputting quantization data from the second feature data, and the probability neural network 330 for outputting probability data from the second feature data.

In an embodiment, the modifying of the probability data may include dividing the sample values of the probability data by the sample values of the quantization data.

According to an embodiment, the image decoding device 500 may include the obtainer 510 for obtaining, for first feature data obtained by neural network-based encoding of the current image 100, second feature data from a bitstream.

In an embodiment, the image decoding device 500 may include the predictive decoder 530 for reconstructing the current image 100 by neural network-based decoding of the dequantized first feature data.

In an embodiment, the obtainer 510 may include the AI controller 650 for obtaining quantization data and probability data by applying the second feature data to the neural network 330, 350 or 410, and modifying the probability data based on sample values of the quantization data.

In an embodiment, the obtainer 510 may include the entropy decoder 610 for obtaining quantized first feature data by applying entropy decoding based on the modified probability data for bits included in the bitstream.

In an embodiment, the obtainer 510 may include the dequantizer 630 for obtaining dequantized first feature data by dequantizing the quantized first feature data according to the sample values of the quantization data.

According to an embodiment, the image encoding device 1400 may include the predictive encoder 1410 for obtaining first feature data by neural network-based encoding of the current image 100.

In an embodiment, the image encoding device 1400 may include the generator 1420 for generating a bitstream corresponding to the current image 100.

In an embodiment, the generator 1420 may include the AI controller 1510 for obtaining the second feature data for the first feature data by applying the first feature data to the first neural network 310, obtaining quantization data and probability data by applying the second feature data to the second neural network 330, 350 or 410, and modifying the probability data based on sample values of the quantization data.

In an embodiment, the generator 1420 may include the quantizer 1530 for obtaining quantized first feature data by quantizing the first feature data according to the sample values of the quantization data.

In an embodiment, the generator 1420 may include the entropy encoder 1550 for generating a bitstream including bits corresponding to the quantized first feature data by applying entropy encoding based on the modified probability data for the quantized first feature data.

In an embodiment, the bitstream may include bits corresponding to the second feature data.

The image encoding device 1400, the image decoding device 500 and methods thereby according to an embodiment aim to efficiently quantize/dequantize the feature data generated by AI based encoding for images.

The image encoding device 1400, the image decoding device 500 and methods thereby according to an embodiment aim to reduce the bitrate of the bitstream generated as a result of encoding an image and improve the quality of the reconstructed image.

The image encoding device 1400, the image decoding device 500 and methods thereby according to an embodiment may aim to improve efficiency of entropy coding.

The image encoding device 1400, the image decoding device 500 and methods thereby according to an embodiment may aim to provide an AI based end-to-end encoding/decoding system.

The aforementioned embodiments of the present disclosure may be programmable to be executed in a computer, and the program may be stored in a machine-readable storage medium.

The machine-readable storage medium may be provided in the form of a non-transitory storage medium. The term "non-transitory storage medium" may mean a tangible device without including a signal (e.g., electromagnetic waves) and may not distinguish between storing data in the storage medium semi-permanently and temporarily. For example, the non-transitory storage medium may include a buffer that temporarily stores data.

In an embodiment, the aforementioned method according to the various embodiments of the disclosure may be provided in a computer program product. The computer program product may be a commercial product that may be traded between a seller and a buyer. The computer program product may be distributed in the form of a machine-readable storage medium (e.g., a CD-ROM) or distributed directly between two user devices (e.g., smart phones) or online (e.g., downloaded or uploaded). In the case of the online distribution, at least part of the computer program product (e.g., a downloadable app) may be at least temporarily stored or arbitrarily created in a storage medium that may be readable to a device such as a server of the manufacturer, a server of the application store, or a relay server.

Various embodiments of the present disclosure have been described above, however those of ordinary skill in the art are to understand and appreciate that the present disclosure is not limited thereto and various modifications may be made without departing the scope of the present disclosure.

What is claimed is:

1. An image decoding method, comprising:

obtaining second feature data from a bitstream for first feature data, the first feature data having been obtained by performing neural network-based encoding on a current image;

obtaining quantization data and probability data by applying the second feature data to a neural network;

modifying the probability data, based on sample values of the quantization data;

obtaining quantized first feature data by applying entropy decoding, based on the modified probability data, on bits comprised in the bitstream;

obtaining dequantized first feature data by dequantizing the quantized first feature data based on the sample values of the quantization data; and reconstructing the current image by performing neural network-based decoding on the dequantized first feature data.

2. The image decoding method of claim 1, wherein the quantization data comprises at least one sample value corresponding to at least one of a quantization parameter or a quantization step size.

3. The image decoding method of claim 1, wherein at least one sample value of the modified probability data indicates a probability of a value which at least one sample of the quantized first feature data is able to have.

4. The image decoding method of claim 3, wherein the at least one sample value of the modified probability data indicates an average value and a standard deviation corresponding to at least one sample of the quantized first feature data.

5. The image decoding method of claim 4, further comprising:

applying the average value and the standard deviation indicated by the at least one sample value of the modified probability data to a predetermined probability model to derive the probability of the value which the at least one sample of the quantized first feature data is able to have.

6. The image decoding method of claim 1, wherein the modifying of the probability data comprises:

dividing sample values of the probability data by the sample values of the quantization data.

7. The image decoding method of claim 1, wherein the first feature data comprises at least one of:

feature data obtained by applying the current image to an image encoder;

feature data obtained by applying the current image and a previously reconstructed image to an optical flow encoder; or feature data obtained by applying a residual image corresponding to the current image to a residual encoder.

8. The image decoding method of claim 1, wherein the neural network is trained based on at least one of a bitrate of the bitstream or a difference between a current training image and a current reconstructed training image.

9. The image decoding method of claim 1, wherein a plurality of probability data and a plurality of weights are obtained by applying the second feature data to the neural network, wherein the plurality of probability data are modified, based on the sample values of the quantization data, and wherein a probability of a value which at least one sample of the quantized first feature data is able to have is determined, by combining the modified plurality of probability data according to the plurality of weights.

10. A non-transitory computer-readable storage medium storing computer-executable instructions for image decoding that, when executed by at least one processor of a device, cause the device to perform the method of claim 1.

11. An image encoding method, comprising:

applying, to a first neural network, first feature data obtained by performing neural network-based encoding on a current image to obtain second feature data of the first feature data;

obtaining quantization data and probability data by applying the second feature data to a second neural network;

modifying the probability data, based on sample values of the quantization data;

obtaining quantized first feature data by quantizing the first feature data according to the sample values of the quantization data; and generating a bitstream comprising first bits corresponding to the quantized first feature data, by applying entropy encoding, based on the modified probability data, to the quantized first feature data, wherein the bitstream further comprises second bits corresponding to the second feature data.

12. The image encoding method of claim 11, wherein the obtaining of the quantization data and the probability data comprises:

outputting the quantization data by applying the second feature data to a quantization neural network; and outputting the probability data by applying the second feature data to a probability neural network.

13. The image encoding method of claim 11, wherein the modifying of the probability data comprises:

dividing sample values of the probability data by the sample values of the quantization data.

14. An image decoding device, comprising:

one or more processors comprising processing circuitry; and a memory storing instructions, wherein the instructions, when executed by the one or more processors individually or collectively, cause the image decoding device to:

obtain second feature data from a bitstream for first feature data, the first feature data having been obtained by performing neural network-based encoding on a current image;

obtain quantization data and probability data by applying the second feature data to a neural network;

modify the probability data, based on sample values of the quantization data;

obtain quantized first feature data by applying entropy decoding based on the modified probability data on bits comprised in the bitstream;

obtain dequantized first feature data by dequantizing the quantized first feature data based on the sample values of the quantization data; and reconstruct the current image by performing neural network-based decoding on the dequantized first feature data.

* * * * *